United States Patent
Reiss et al.

(10) Patent No.: US 10,124,264 B2
(45) Date of Patent: *Nov. 13, 2018

(54) WIRELESS GAME/AUDIO SYSTEM AND METHOD

(71) Applicant: AG Acquisition Corporation, San Francisco, CA (US)

(72) Inventors: Jordan Reiss, San Francisco, CA (US); Lars Gilstrom, Berkeley, CA (US); Robert Jetter, Pleasanton, CA (US); Adam Barry, San Francisco, CA (US); Brett Lovelady, Saratoga, CA (US)

(73) Assignee: LOGITECH EUROPE, S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,015

(22) Filed: Jun. 25, 2013

(65) Prior Publication Data

US 2013/0288795 A1    Oct. 31, 2013

Related U.S. Application Data

(63) Continuation of application No. 12/958,462, filed on Dec. 2, 2010, now Pat. No. 8,491,386.

(Continued)

(51) Int. Cl.
*A63F 9/24* (2006.01)
*A63F 13/87* (2014.01)
(Continued)

(52) U.S. Cl.
CPC .......... *A63F 13/87* (2014.09); *A63F 13/235* (2014.09); *A63F 13/25* (2014.09); *A63F 13/98* (2014.09);
(Continued)

(58) Field of Classification Search
CPC .......... A63F 13/54; A63F 13/87; A63F 13/02; A63F 13/215; A63F 13/25; A63F 13/28;
(Continued)

(56) References Cited

U.S. PATENT DOCUMENTS

| 2,782,423 A | 2/1957 | Eli et al. ........................... 2/209 |
| 4,270,025 A | 5/1981 | Alsup et al. ........... 179/15.55 R |

(Continued)

FOREIGN PATENT DOCUMENTS

| EP | 1638364 | 3/2006 |
| WO | WO 03/103255 | 12/2003 |

OTHER PUBLICATIONS

International Search Report and Written Opinion for Application Serial No. PCT/US2010/058629, dated Jan. 28, 2011, 8 pp.

(Continued)

*Primary Examiner* — Justin Myhr
(74) *Attorney, Agent, or Firm* — Patterson & Sheridan, LLP

(57) ABSTRACT

Methods and Systems for providing multiple audio streams, such as a Game Audio stream and Network Chat audio stream, to a headset of a user of a game console are described. The methods and systems include receiving, by a game console controller in communication with a game console and a portable audio mixing module, Network Chat from a game console; receiving, by a portable audio mixing module in communication with a game console controller, Network Chat; receiving, by a base station in communication with the game console and the portable audio mixing module, the Game Audio; receiving, by the portable audio mixing module, the Game Audio; mixing, by the portable audio mixing module, the Network Chat and Game Audio to produce a blended audio output stream; and transmitting, by the portable audio mixing module, the blended audio output (Continued)

stream to a headset in communication with the portable audio mixing module.

5 Claims, 34 Drawing Sheets

Related U.S. Application Data

(60) Provisional application No. 61/266,007, filed on Dec. 2, 2009.

(51) Int. Cl.
    *A63F 13/235*     (2014.01)
    *A63F 13/25*     (2014.01)
    *A63F 13/98*     (2014.01)
    *H04R 3/00*     (2006.01)
    *H04R 5/04*     (2006.01)

(52) U.S. Cl.
    CPC . *A63F 2300/1031* (2013.01); *A63F 2300/406* (2013.01); *A63F 2300/572* (2013.01); *A63F 2300/6063* (2013.01); *H04R 3/00* (2013.01); *H04R 5/04* (2013.01)

(58) Field of Classification Search
    CPC .............. A63F 13/98; A63F 2300/572; A63F 2300/6063; A63F 2300/6081; G06F 3/165; H04R 2430/01; H04R 5/033; H04S 1/005; H04S 3/004
    USPC .............................................. 463/35, 40–42
    See application file for complete search history.

(56) References Cited

U.S. PATENT DOCUMENTS

| | | | | |
|---|---|---|---|---|
| 4,302,635 A | 11/1981 | Jacobsen et al. | ............. | 381/371 |
| 4,472,607 A | 9/1984 | Houng | ............. | 181/18 |
| 4,554,993 A | 11/1985 | Houng | ............. | 181/130 |
| 4,588,868 A | 5/1986 | Bertagna et al. | ............. | 381/382 |
| 4,829,571 A | 5/1989 | Kakiuchi et al. | ............. | 381/309 |
| 4,965,836 A | 10/1990 | Andre et al. | ............. | 381/370 |
| 5,018,599 A | 5/1991 | Dohl et al. | ............. | 181/129 |
| 5,035,005 A | 7/1991 | Hung | ............. | 2/209 |
| 5,579,430 A | 11/1996 | Grill et al. | ............. | 395/2.12 |
| 5,685,775 A | 11/1997 | Bakoglu et al. | ............. | 463/41 |
| 5,793,878 A | 8/1998 | Chang | ............. | 381/370 |
| 6,016,347 A | 1/2000 | Magnasco et al. | ............. | 379/430 |
| 6,069,964 A | 5/2000 | Yang | ............. | 381/374 |
| 6,097,809 A | 8/2000 | Lucey et al. | ............. | 379/430 |
| 6,183,367 B1 | 2/2001 | Kaji et al. | ............. | 463/42 |
| 6,241,612 B1 | 6/2001 | Heredia | ............. | 463/42 |
| 6,295,366 B1 | 9/2001 | Haller et al. | ............. | 381/374 |
| 6,466,681 B1 | 10/2002 | Siska, Jr. et al. | ............. | 381/372 |
| 6,599,194 B1 | 7/2003 | Smith et al. | ............. | 463/30 |
| 6,618,714 B1 | 9/2003 | Abrahams | ............. | 706/45 |
| 6,658,130 B2 | 12/2003 | Huang | ............. | 381/384 |
| 6,731,771 B2 | 5/2004 | Cottrell | ............. | 381/371 |
| 6,775,390 B1 | 8/2004 | Schmidt et al. | ............. | 381/371 |
| 6,868,164 B2 | 3/2005 | Ito et al. | ............. | 381/370 |
| 7,082,393 B2 | 7/2006 | Lahr | ............. | 704/233 |
| 7,090,582 B2 | 8/2006 | Danieli et al. | ............. | 463/35 |
| 7,181,037 B2 | 2/2007 | Birch | ............. | 381/375 |
| 7,371,175 B2 | 5/2008 | Gilboy et al. | ............. | 463/35 |
| 7,458,894 B2 | 12/2008 | Danieli et al. | ............. | 463/42 |
| 1,127,161 A1 | 2/2015 | Baldwin | ............. | 381/379 |
| 2001/0044277 A1 | 11/2001 | Kremsl et al. | | |
| 2002/0110246 A1 | 8/2002 | Gosior et al. | ............. | 381/2 |
| 2002/0131616 A1 | 9/2002 | Bronnikov et al. | ............. | 381/370 |
| 2002/0196960 A1 | 12/2002 | Pham et al. | ............. | 381/375 |
| 2004/0132509 A1 | 7/2004 | Glezerman | ............. | 455/575.2 |
| 2004/0198436 A1 | 10/2004 | Alden | | |
| 2004/0213427 A1 | 10/2004 | Yoon | ............. | 381/370 |
| 2005/0003892 A1 | 1/2005 | Cheng et al. | ............. | 463/35 |
| 2005/0007500 A1 | 1/2005 | Lin et al. | ............. | 348/790 |
| 2005/0159833 A1 | 7/2005 | Giaimo et al. | | |
| 2005/0181872 A1 | 8/2005 | Acharya et al. | ............. | 463/35 |
| 2006/0062417 A1 | 3/2006 | Tachikawa | ............. | 381/378 |
| 2006/0084504 A1 | 4/2006 | Chan et al. | ............. | 463/39 |
| 2006/0256992 A1 | 11/2006 | Liao | ............. | 381/371 |
| 2007/0004472 A1 | 1/2007 | Gitzinger | | |
| 2007/0064969 A1 | 3/2007 | Chou | ............. | 381/381 |
| 2007/0093279 A1 | 4/2007 | Janik | ............. | 455/569.1 |
| 2007/0183616 A1 | 8/2007 | Wahl et al. | ............. | 381/370 |
| 2007/0261153 A1 | 11/2007 | Wise et al. | ............. | 2/423 |
| 2008/0085676 A1 | 4/2008 | Huang | | |
| 2008/0152160 A1 | 6/2008 | Chew et al. | ............. | 381/71.6 |
| 2008/0165989 A1 | 7/2008 | Seil et al. | ............. | 381/119 |
| 2008/0311986 A1 | 12/2008 | Reiss et al. | ............. | 463/35 |
| 2009/0252355 A1 | 10/2009 | Mao | ............. | 381/309 |
| 2010/0285750 A1 | 11/2010 | Simonelic | ............. | 455/41.3 |

OTHER PUBLICATIONS

Fibush, David K., "Integrating Digital Audio Into the Serial Digital Video Signal," SMPTE Journal, pp. 574-579, Sep. 1994.

Press Release, "Xbox Turns Up the Volume on the Future of Video Games" [online], May 20, 2001 [retrieved on Apr. 8, 2010], 2 pp., Retrieved From the Internet: http://www.microsoft.com/presspass/press/2002/may02/05-20e3brie...

Turtle Beach, "New Gaming Headphones Provide Amplification of Game Audio and Xbox Live Chat" [online], Oct. 8, 2006 [retrieved on Apr. 8, 2010], 1 p., Retrieved From the Internet: http://www.turtlebeach.com/releases/20061008/Ear-Force-X1-Xbo...

Turtle Beach, "First Wireless Headphone for Xbox 360 with Independent Volume Control of Amplified Chat and Game Audio" [online], Aug. 22, 2007 [retrieved on Apr. 8, 2010], 2 pp., Retrieved From the Internet: http://www.turtlebeach.com/releases/20070822/Turtle-Beach-Annou...

Block, Gerry, "Turtle Beach X2 Wireless Headset Review," IGN, May 3, 2006, http://www.ign.com/articles/2006/05/04/turtle-beach-x2-wireless-headset-review.

"Zehn Kopfhorer-Mikrofon-Sets im Vergleich," Computer Bild, Oct. 17, 2007 [retrieved on Mar. 2, 2009], pp. 2-12, http://www.computerbild.de/artikel/cbs-Tests-Hardware-Zehn-Kopfhoerer-Mikrofon-Sets-im-Vergleich-1873070.html.

International Search Report for Application Serial No. PCT/US2008/087280, dated Jul. 15, 2009.

Supplementary European Search Report and European Search Opinion for European Application No. EP 10 83 5092, dated Feb. 25, 2014, 14 pp.

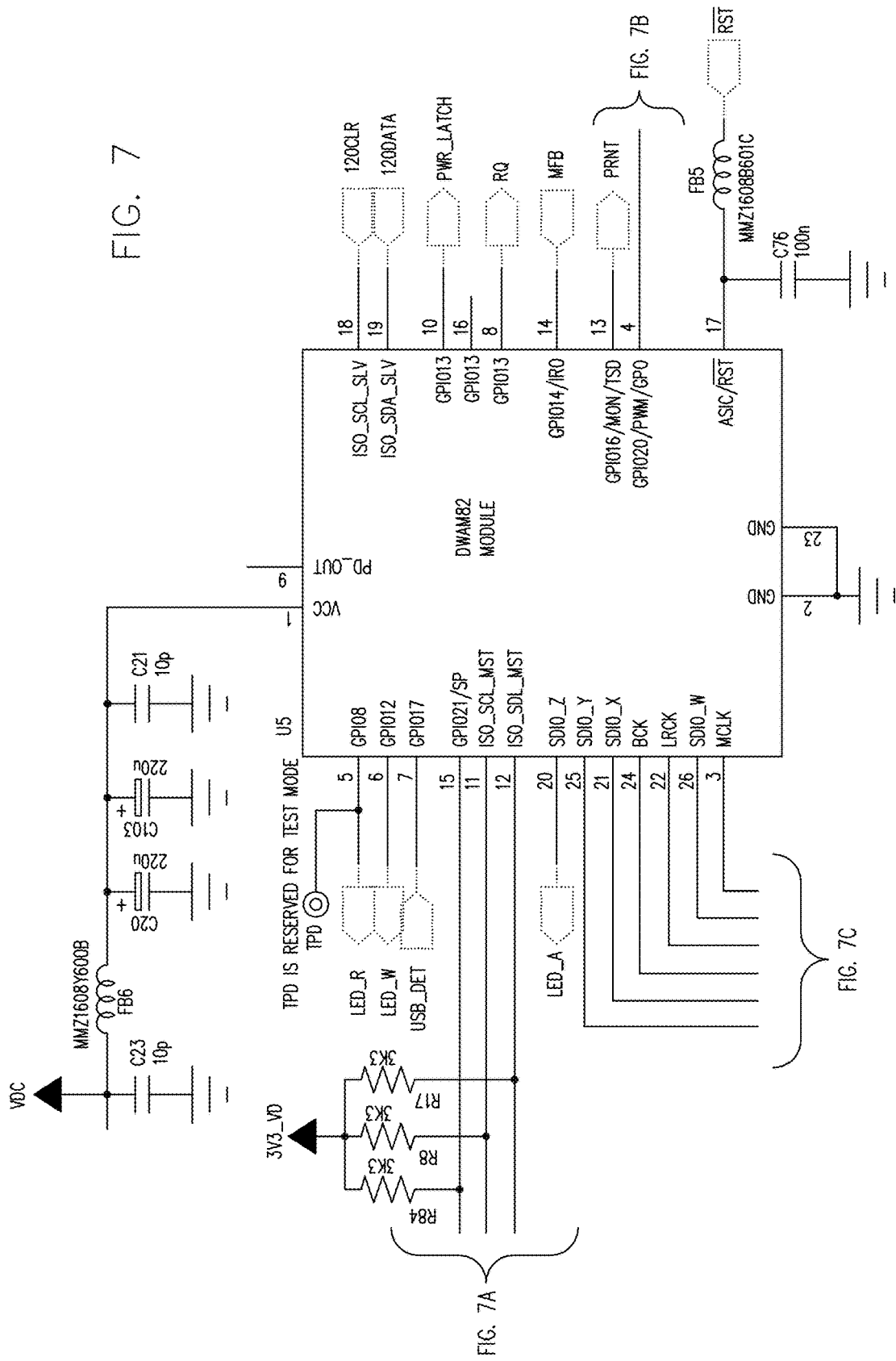

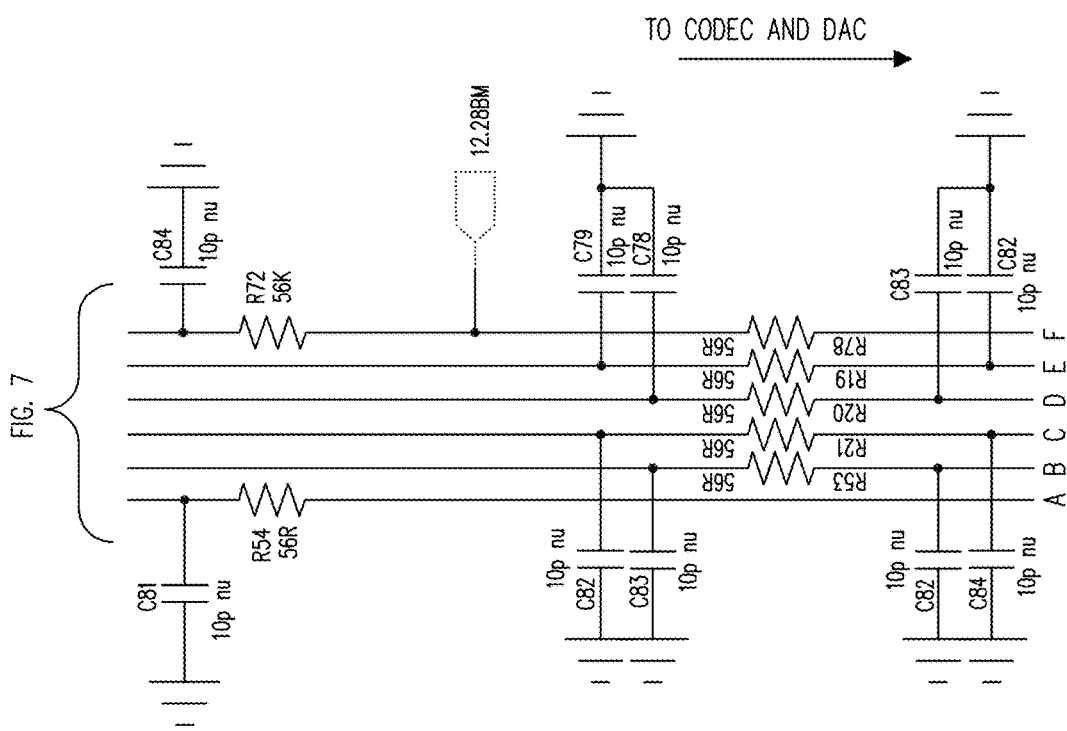

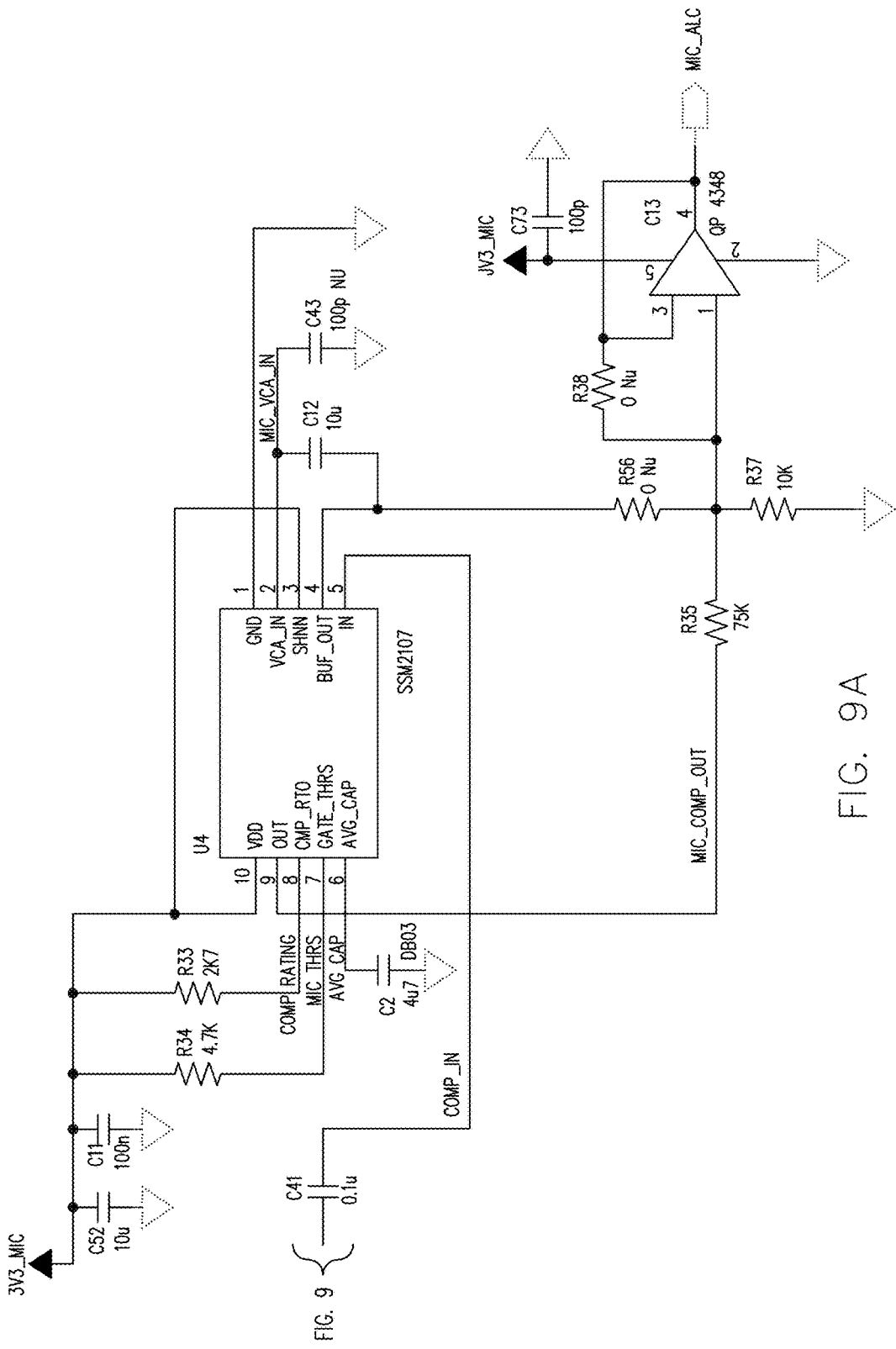

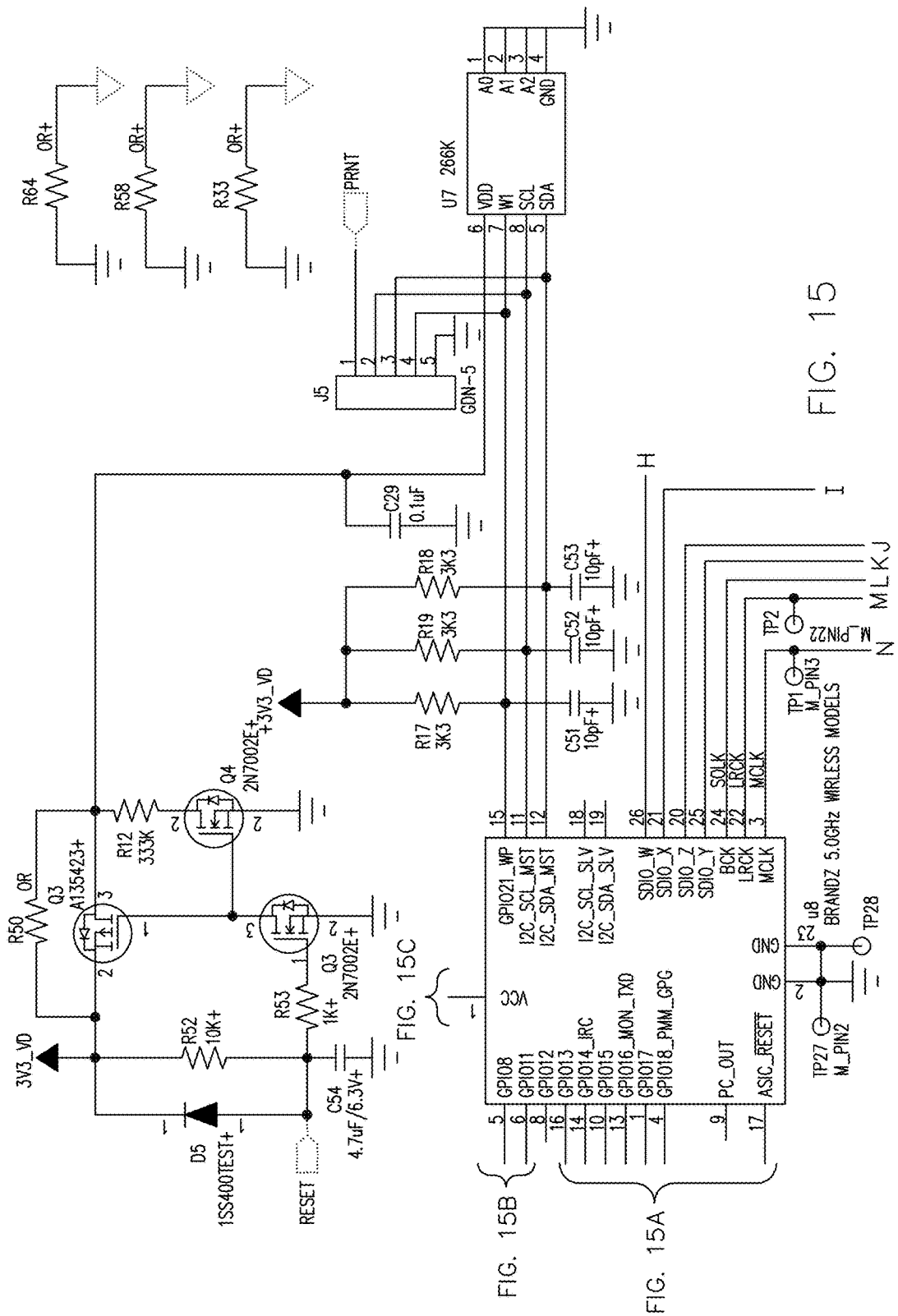

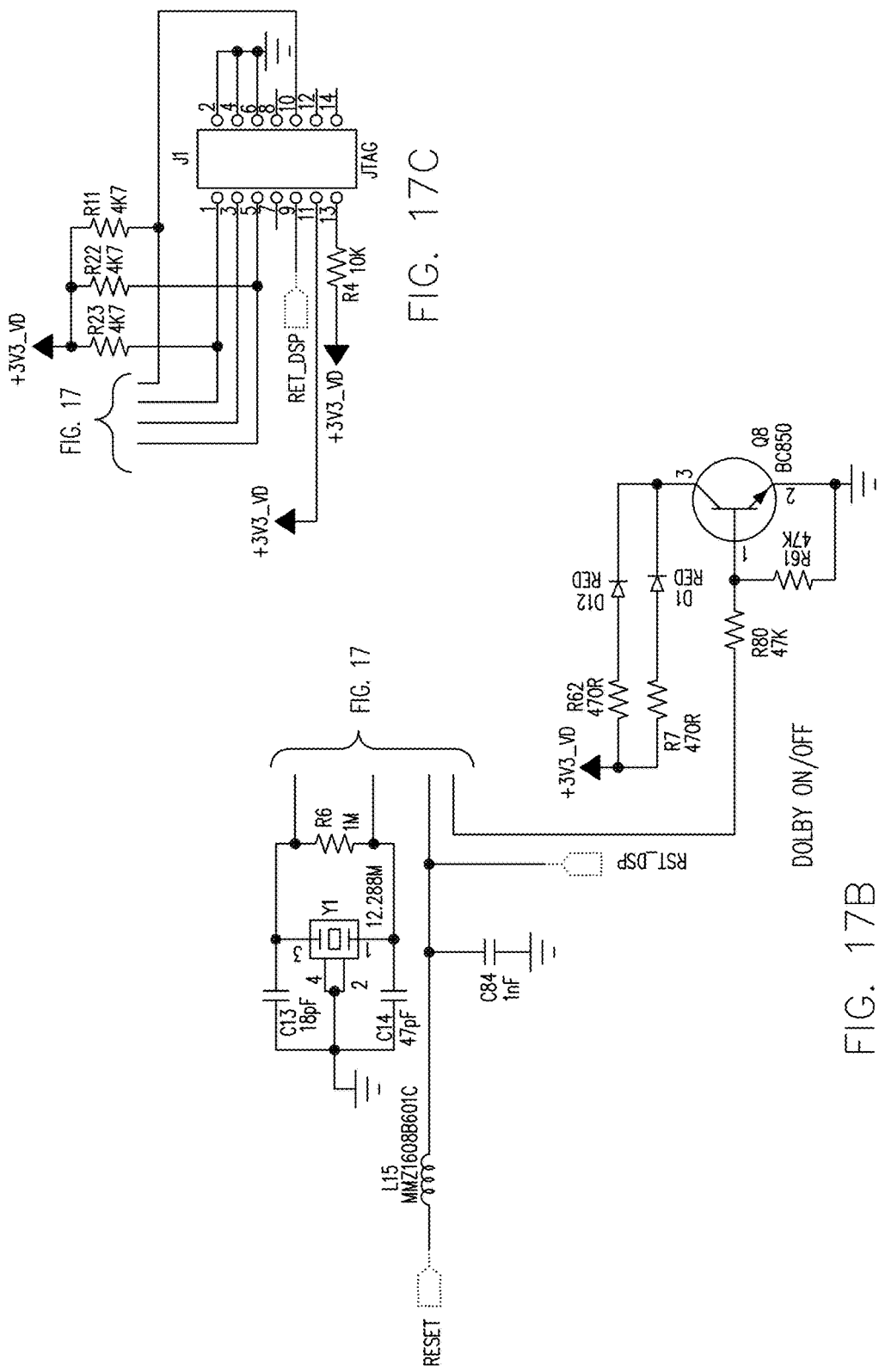

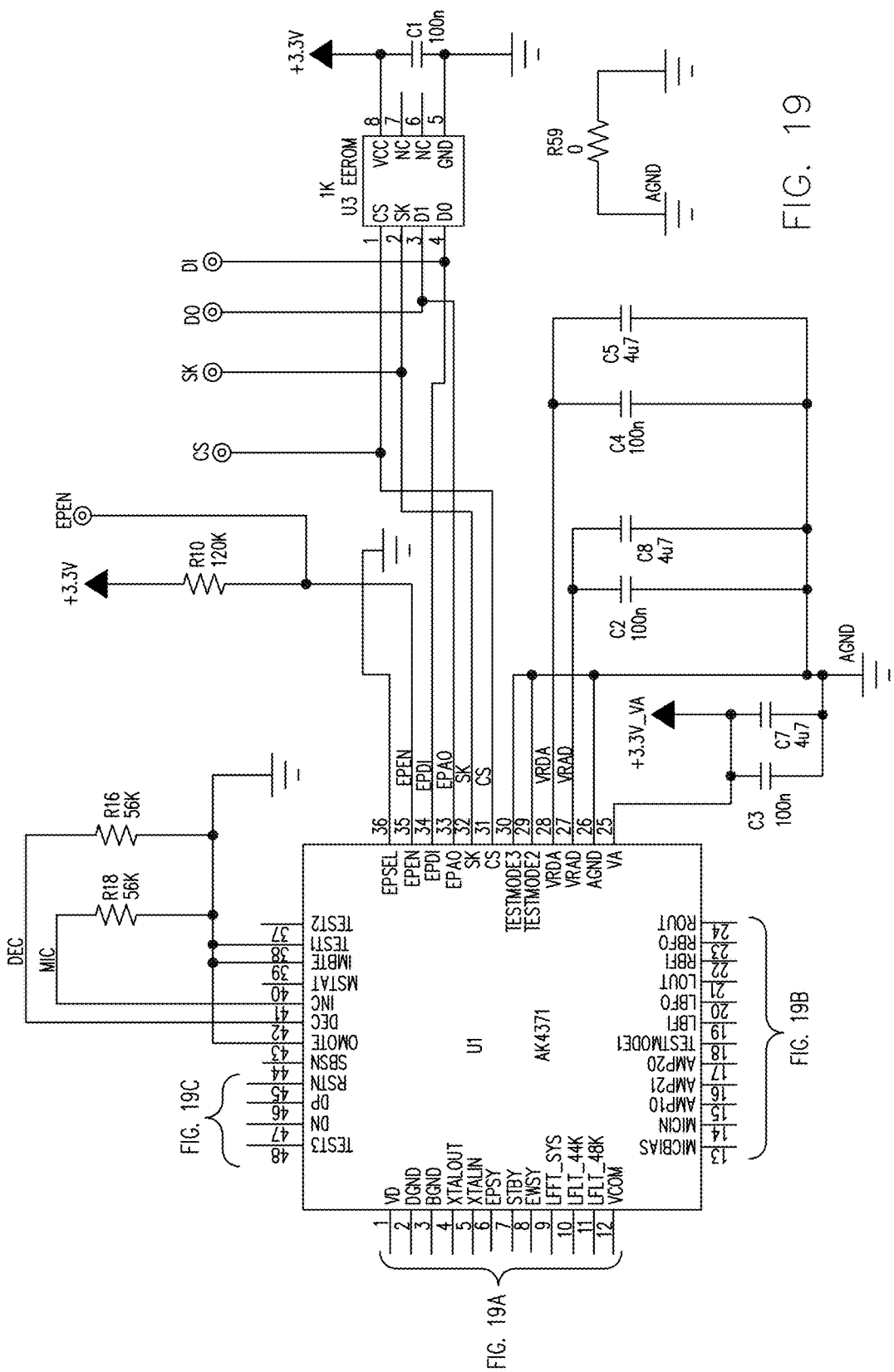

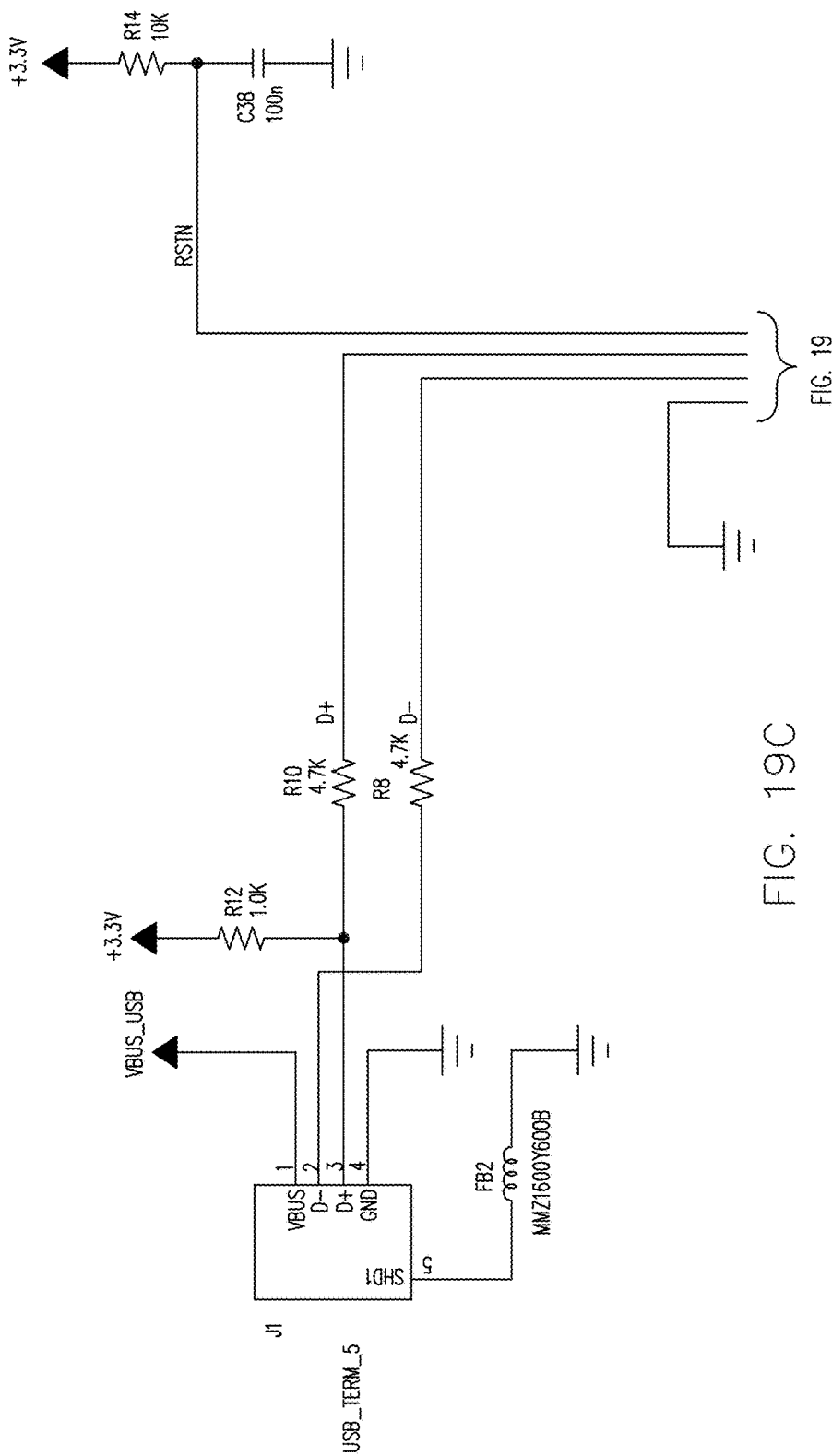

WIRELESS GAME/AUDIO SYSTEM AND METHOD

CROSS-REFERENCE TO RELATED APPLICATIONS

This application is a continuation of U.S. application Ser. No. 12/958,462, filed Dec. 2, 2010, which claims the benefit of U.S. Provisional Application No. 61/266,007, filed Dec. 2, 2009, both of which are incorporated herein by reference in their entirety.

FIELD OF THE INVENTION

The invention relates generally to audio signal transmission and reception for gaming consoles. More particularly, the invention relates to systems and methods for providing multiple users of a single gaming console a wireless audio connection to multiple audio signals from the gaming console while allowing for the use of any standard headset.

BACKGROUND

Evolution of gaming has created the need for more advanced audio and communication solutions. A gamer wishing to utilize a personal headset during game play wants a better audio experience without the need to be physically tethered to a gaming console. Moreover, serious gamers require the ability to converse with other gamers at remote locations and listen to game audio simultaneously through the use of a headset.

Typically, a gamer wishing to participate in such conversation while gaming has two options. First, a gamer may allow game audio to play through an external speaker, such as a television or stereo system, while a headset is used to converse with networked players. This option, however, is not practical if a gamer wants to play a game without disturbing those around her or wants to utilize headphones to listen to game audio in, for example, surround sound. Moreover, this option is not ideal for serious gamers, as it is difficult or distracting for the gamer to control the volume of the external speaker and the volume of the headset, as two controllers or other adjustment means are necessary.

The second option is for the gamer to purchase a wired or wireless headset for each gaming console or system. The wired headphone option may not be practical for a gamer wishing to operate a game console controller from a distance farther than the wired headphone may reach or for a gamer who wishes to move around a room unrestrained. Moreover, many gamers already own a preferred wired headset, and these individuals either may not be able to afford, or may not wish to purchase, a different wireless headset for each gaming system at great personal expense.

One solution to the above problems is described in U.S. patent application Ser. No. 12/047,260, titled "Daisy-Chained Game Audio Exchange," incorporated by reference in its entirety herein. This application discloses a daisy-chainable game exchange which allows a gamer to utilize their own headset to play games in surround sound. The user may physically plug the daisy-chainable game exchange into a number of audio sources including a gaming console and either a Xbox 360® controller producing an network chat stream from the Xbox Live® Network or another daisy-chainable game exchange to receive a local-area network chat stream. Unfortunately, the user's range of motion is restricted, as the daisy-chainable game exchange must be plugged into the gaming console.

Accordingly, there is a need in the art for a method and system to allow multiple gamers to play on a single gaming console, without being connected thereto, and while utilizing any standard headset.

SUMMARY OF THE INVENTION

Exemplary embodiments described herein overcome the drawbacks of conventional wired and wireless gaming audio options. Methods and systems of the present invention allow a gamer to utilize any standard headset to receive both game audio and network chat audio streams wirelessly and simultaneously. Moreover, the present invention may allow a gamer to adjust the volume and balance of an audio stream received at a headset through the use of one or more controls.

In one aspect of the invention, a method of providing a Game Audio stream and Network Chat audio stream to a headset of a user of a game console is provided. The method includes receiving, by a game console controller in communication with a game console and a portable audio mixing module, the Network Chat from the game console; receiving, by the portable audio mixing module in communication with the game console controller, the Network Chat; receiving, by a base station in communication with the game console and the portable audio mixing module, the Game Audio; receiving, by the portable audio mixing module, the Game Audio; mixing, by the portable audio mixing module, the Network Chat and Game Audio to produce a blended audio output stream; and transmitting, by the portable audio mixing module, the blended audio output stream to a headset in communication therewith.

In another aspect of the invention, a method of providing a Game Audio stream and Network Chat audio stream to a headset of a user of a game console is provided. The method includes receiving, by a base station in communication with a game console, the Network Chat and Game Audio from the game console; transmitting, by the base station, the Network Chat and Game Audio to a portable audio mixing module that is wirelessly connected to the base station; wirelessly receiving, by the portable audio mixing module connected to the base station, the Network Chat and Game Audio streams; mixing, by the portable audio mixing module, the Network Chat and Game Audio streams to produce a blended audio output stream; and transmitting, by the portable audio mixing module, the blended audio output stream to a headset in communication with therewith.

In yet another aspect of the invention, a system for transmitting a Game Audio stream and Network Chat audio stream to a headset of a user of a gaming console is provided. The system includes a game console in communication with a network such that the Network Chat is received by the game console over the network, the game console adapted to transmit the Network Chat to a game console controller in communication therewith and the Game Audio to a base station in communication therewith; at least one game console controller in communication with the game console, the game console controller adapted to receive the Network Chat transmitted from the game console; a base station in communication with the game console, the base station adapted to receive the Game Audio transmitted from the game console; and at least one portable audio mixing module wirelessly connected to the base station, in communication with the headset, and in communication with the game console controller, the portable audio mixing module adapted to receive the Network Chat from the game console controller and the Game Audio from the base station, the portable audio mixing module comprising mixing circuitry such that the Network Chat and Game Audio are mixed to produce a blended audio output stream received by the headset.

In another aspect of the invention, a system for transmitting a Game Audio stream and Network Chat audio stream to a headset of a user of a gaming console is provided. The system includes a game console in communication with a network such that the Network Chat is received by the game console over the network; a base station in communication with the game console, the base station adapted to receive the Network Chat and Game Audio transmitted therefrom; and at least one portable audio mixing module wirelessly connected to the base station, the portable audio mixing module adapted to receive the Network Chat and the Game Audio from the base station, the portable audio mixing module comprising mixing circuitry such that the Network Chat and Game Audio are mixed to produce a blended audio output stream.

BRIEF DESCRIPTION OF THE DRAWINGS

The preferred embodiments of the present invention are illustrated by way of example and not limited to the following figures:

FIGS. 7, 7A, 7B, and 7C are a circuit diagram illustrating exemplary circuitry of an embodiment of a portable audio mixing module.

FIGS. 9 and 9A are a circuit diagram illustrating exemplary circuitry of an embodiment of a portable audio mixing module.

FIGS. 15, 15A, 15B, and 15C are a circuit diagram illustrating exemplary circuitry of an embodiment of a base station.

FIGS. 17, 17A, 17B, and 17C are a circuit diagram illustrating exemplary circuitry of an embodiment of a base station.

FIGS. 19, 19A, 19B, and 19C are a circuit diagram illustrating exemplary circuitry of an embodiment of a base station.

DETAILED DESCRIPTION

Figure 1:
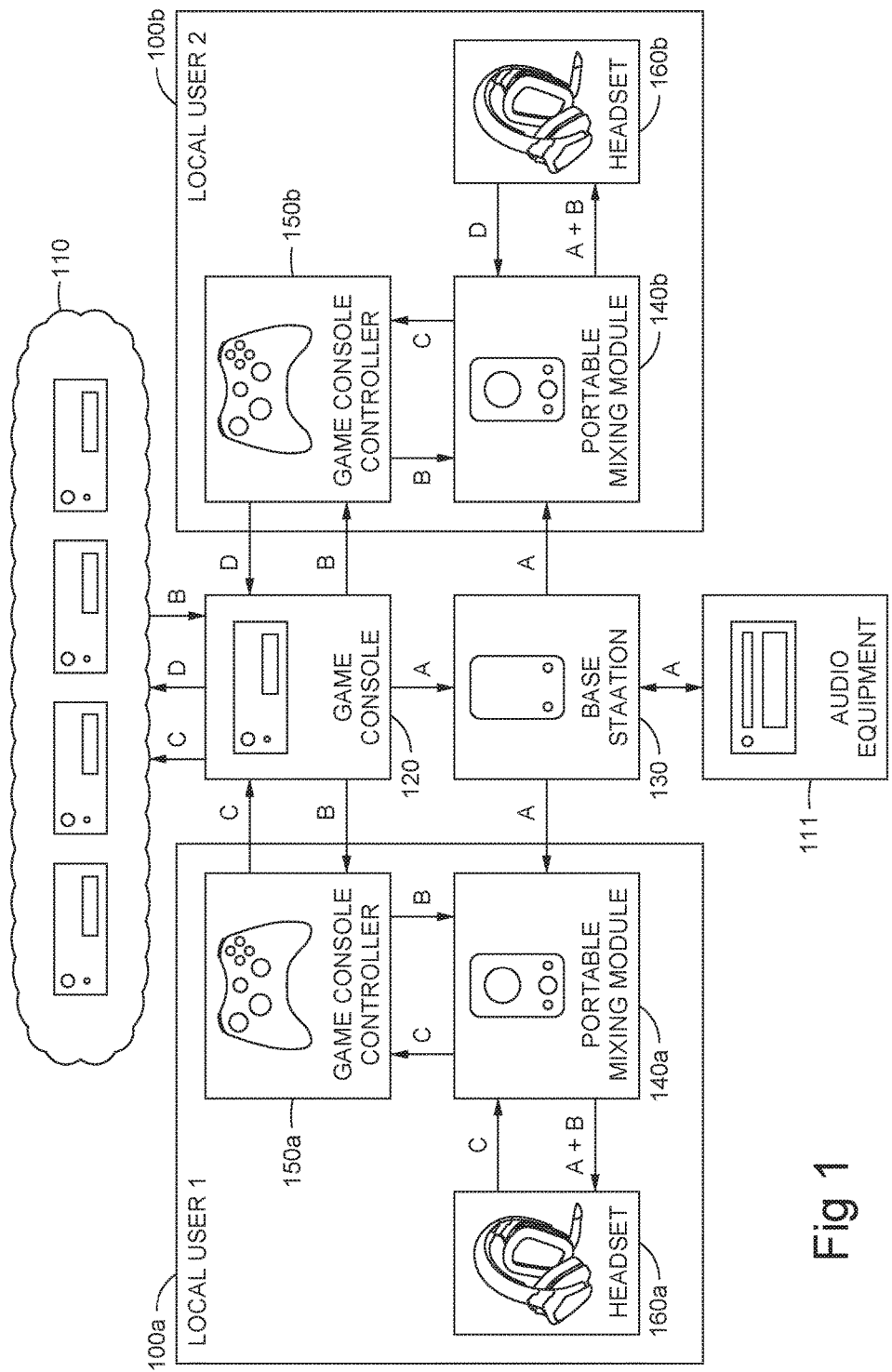
FIG. 1 shows a system architecture according to an exemplary embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions. All terms used herein are intended to have their ordinary meaning in the art unless otherwise provided.

The terms "game console" and "gaming console" are used interchangeably and will refer to any general purpose computer, personal computer, specialized computer, laptop, portable gaming device, or other electronic equipment capable of transmitting a digital audio signal. Gaming consoles may comprise processors, memory, circuitry, input/output devices, audio-input jacks, audio-output jacks, video-input jacks, video-output jacks, and/or displays. A number of exemplary gaming consoles will not comprise a display, but will rather comprise video-output jacks such that they may be electrically connected to a television or other external displays. In many embodiments, the gaming console may be controlled by various input devices such as gaming console controllers containing track-balls, buttons, and/or triggers. The terms gaming console controller and game console controller are used interchangeably herein. Exemplary gaming consoles include but are not limited to the Xbox® and Xbox 360® from Microsoft® and the PlayStation® 2 and PlayStation® 3 from Sony®.

As used herein, the term "Game Audio" will refer to an audio stream or signal transmitted from a gaming console. The Game Audio may represent the audio a user hears when playing a game or other multimedia content on a gaming console. As an example, Game Audio may include such sounds as background music, sound effects, character dialogue, explosions and other sounds encountered during game or media play. In other exemplary embodiments, such as when a movie plays on a laptop, the Game Audio may be the audio transmitted from the laptop when playing the movie.

The term "Local User Chat" will refer to an audio stream or signal sent from a microphone of a local user (e.g. gamer) of a gaming console. Exemplary Local User Chat includes but is not limited to the audio stream produced by a gamer talking through a microphone of a headset. It will be appreciated that multiple users may locally game on the same gaming console simultaneously and in these instances, each user with a microphone may produce a different Local User Chat stream or signal.

The term "Network Chat" will refer to an audio stream or signal received by a local gaming console over a network. The Network Chat may comprise one or more audio streams from at least one networked user's microphone. Exemplary Network Chat is the audio stream or signal received from the Xbox Live® Network, the PlayStation® Network, and/or the Nintendo Wii® Network. Another example of Network Chat may be the audio stream received over a local area network (LAN) and originating at a networked user's headset.

Embodiments of the present invention allow multiple local users of a gaming console to each listen to both Game Audio and Network Chat through their own headsets, and to transmit Local User Chat through their own headset, without being tethered to the gaming console. In this way, a user may listen as loudly as she would like during a gaming session without disturbing others, while having free-movement about the room where the console is located. The present invention further allows each user to enjoy these features without the need to purchase a new headset, and without sacrificing audio quality.

In one embodiment, the Game Audio and Network Chat streams may be received by a portable audio mixing module. The portable audio mixing module may combine, mix, or blend the Game Audio and Network chat such that the blended audio output stream may be output to a headset connected thereto. The portable audio mixing module may allow a user to control the balance of the Game Audio and Network Chat streams and/or may allow a user to control the volume of the blended audio output stream. Moreover, the portable audio mixing module may be adapted to receive Local User Chat from a connected headset such that the Local User Chat may be transmitted to a gaming console.

In another embodiment, a base station may be connected to a game console such that Game Audio may be received thereby. The base station may be wirelessly connected to a portable audio mixing module such that Game Audio may be transmitted thereto. Moreover, as described in detail below, the base station may be adapted to transmit and/or receive Network Chat and/or Local User Chat. Therefore, in some embodiments, the base station may receive Network Chat from a game console to transmit to a portable audio mixing module. In yet other embodiments, the base station may receive Local User Chat from a portable audio mixing module to send to a game console.

Moreover, various embodiments of the present invention allow each user to selectively control the mixed audio stream received at the headset, for example, by allowing users to manipulate the volume and/or the balance of the Game Audio and/or Network Chat streams. In this way, gamers may better focus on the social networking aspect of gaming by increasing the degree of Network Chat received or the user may refocus on game play by increasing the degree of Game Audio received, all without losing either stream.

Xbox Mode

Referring to FIG. 1 an exemplary system is shown, wherein multiple gamers 100*a*, 100*b* may listen to both Game Audio A and Network Chat B from a game console 120 using a headset 160*a*, 160*b*, without the need for the headset to be connected directly to the game console 120. Further, the depicted system allows a gamer 100*a*, 100*b* to socially interact with other garners over a network 110 by using the microphone of their headset 160*a*, 160*b*, such that the Local User Chat C, D will propagate through the system to the networked users. As shown, a first user 100*a* and a second user 100*b* may both play the same game on the same gaming console 120 simultaneously.

A game console 120 may be connected to a network 110 by any means known in the art, such as through a physical Ethernet connection or through a wireless connection. In this particular embodiment, the users 100*a*, 100*b* are playing a game on an Xbox 360® 120 game console, which is connected to multiple other consoles through the Xbox Live® Network 110. In order to operate the gaming console 120, each gamer 100*a*, 100*b* may utilize a gaming console controller 150*a*, 150*b*, which is connected to the gaming console via either a wired or wireless connection.

Receiving the Game Audio and Network Chat

The gaming console 120 may be electrically connected to a transmitting device or base station 130 such that the base station may receive Game Audio A in a digital form, from the gaming console 120. The base station 130 may be connected to the gaming console 120 via any means known in the art, such as but not limited to, a TOSLINK® optical cable, an HDMI® cable, and/or any other coaxial-type digital audio cables. As described in further detail below, in the embodiment shown, the base station 130 may receive Game Audio A from the gaming console 120 to wirelessly transmit to a user 100*a*, 100*b*.

In the pictured embodiment, both users 100*a*, 100*b* are in possession of a portable audio mixing module 140*a*, 140*b*, and both of the portable audio mixing modules 140*a*, 140*b* are wirelessly connected to the base station 130. It will be appreciated that the portable audio mixing module 140*a*, 140*b* and base station 130 may be wirelessly connected via any means known in the art. In the embodiment shown, the portable audio mixing modules 140*a*, 140*b* are not interconnected to each other—all portable audio mixing modules 140*a*, 140*b* are connected to the base station 130.

In one particular embodiment, each portable audio mixing module 140*a*, 140*b* is connected or "paired" to the base station 130 over a 5.8 GHz spectrum, which is relatively free from interference from other devices, such as 2.4 GHz wireless products, microwaves, and Bluetooth. In one embodiment, dead zones and performance lag may be reduced by utilizing the 5.8 GHz spectrum as compared to other wireless network standards, and the systems described herein are thought to be capable of transmission of up to about 150 feet. Nevertheless, it will be appreciated that any number of wireless spectrums are thought to be compatible in connecting the base station 130 to a portable audio mixing module 140*a*, 140*b*.

A headset 160*a*, 160*b* may be connected by each user to their respective portable audio mixing modules 140*a*, 140*b* via, for example, a cable with a standard 3.5 mm plug. Additionally, the portable audio mixing module 140*a*, 140*b* may be connected to the game console controller 150*a*, 150*b* via, for example, a cable having a male 2.5 mm plug at both ends. It will be appreciated that, although only two users 100*a*, 100*b* are shown, in various embodiments, the base station 130 may connect to up to four portable audio mixing modules 140*a*, 140*b*, and, therefore, up to four players may game on the gaming console 120 at a single time. Accordingly, the system may comprise 1, 2, 3 or 4 headsets, 1, 2, 3, or 4 portable audio mixing modules, 1,2,3, or 4, game console controllers, but only a single base station.

As shown, Game Audio A may originate at the game console 120 when a user 100*a*, 100*b* starts up the gaming console 120 and instructs the console to playa media type. Once produced by the game console 120, the Game Audio A may be transmitted therefrom and received by the base station 130.

In one embodiment, the base station comprises pass-through circuitry (discussed below), such that, if the base station 130 is powered off, the Game Audio A may pass through the base station 130, to any audio equipment 111 electrically connected to the base station 130. Otherwise, if the base station 130 is powered on, the Game Audio A may be transmitted from the base station 130 to any number of portable audio mixing modules 140*a*, 140*b* connected thereto.

Certain embodiments provide that, if the game console 120 is connected to a network 110, Network Chat B may be received by the game console 120 from the network 110 and transmitted to the game console controllers 150*a*, 150*b* of each user 100*a*, 100*b*. In these embodiments, game console controllers 150*a*, 150*b*, such as but not limited to Xbox 360® controllers, may receive the Network Chat B from the game console 120 and transmit the same to a connected portable audio mixing module of each user 140*a*, 140*b*. Accordingly, in these embodiments, the portable audio mixing module 140*a*, 140*b* does not receive the Network Chat B from the base station 130. Rather, the Network Chat B is received from the game console 120 by each game console controller 150*a*, 150*b*, and then transmitted to each portable audio mixing module 140*a*, 140*b* by the individual game console controller. The game console controllers 150*a*, 150*b* used in this embodiment may be said to be adapted to receive Network Chat B from a game console 120.

As an example, Local User 1's 100*a* portable audio mixing module 140*a* will receive Network Chat B from Local User 1's game console controller 150*a*, which is connected to game console 120 and receives Network Chat B from therefrom. Local User 2's portable audio mixing module 140*b*, on the other hand, receives Network Chat B from Local User 2's game console controller 150*b*, which is also connected to the game console 120.

Once the Game Audio A and/or the Network Chat B are received by a portable audio mixing module 140*a*, 140*b* the two streams/signals may be mixed together and transmitted to the headset 160*a*, 160*b* as a single, blended audio output stream A+B (discussed in detail below). It will be appreciated that the Game Audio A and Network Chat B may be sent and received by individual components of the exemplary system both independently of each other and simultaneously. Moreover, it will be appreciated that, all local users 100*a*, 100*b* may receive the same Game Audio A and Network Chat B streams at their respective portable audio mixing modules 140*a*, 140*b*.

In certain embodiments, the portable audio mixing module 140*a*, 140*b* allows the user to adjust both the volume and balance of the blended audio output stream A+B such that each user may customize the stream received at the headset 160*a*, 160*b*. Therefore, in certain embodiments, Local User 1 100*a*, may adjust the blended audio output stream A+B such that no Network Chat B is audible, while Local User 2 100*b* listens to a blended audio output stream A+B with a very loud Network Chat B signal. In this type of embodiment, although the Network Chat B and Game Audio A streams contain the same content, Local User 1 and Local User 2 will receive different blended audio output streams A+B.

Sending Local User Chat

In certain embodiments, a user's headset 160*a*, 160*b* may contain a microphone such that the user 100*a*, 100*b* may socially interact and/or converse with other gamers over the network 110. Embodiments of the present invention may allow multiple local users 100*a*, 100*b* to participate in such social interaction with networked users both simultaneously and independently.

For example, Local User 1 100*a* may talk into the microphone to produce Local User 1 Chat C. Local User 1 Chat C may be transmitted from the headset 160*a* to the portable audio mixing module 140*a*. Once received by the portable audio mixing module 140*a*, the Local User 1 Chat C is then sent to the game console controller 150*a*, which is connected thereto. The game console controller 150*a* may receive the Local User 1 Chat C and then wirelessly transmit the same, to be received by the game console 120. Finally, the game console 120 may transmit the Local User 1 Chat C over the network 110, where it may be incorporated into the Network Chat B stream and sent to all local and non-local users. Accordingly, in this particular embodiment, the Network Chat B is not sent to, or received by, the base station 130.

Similarly, if Local User 2's 100*b* headset 160*b* includes a microphone, Local User 2 may speak into the microphone to produce a Local User 2 Chat stream D. Although Local User 2 Chat D will propagate through the system in a similar way as Local User 1 Chat C, it will be noted that, because Local User 1's 100*a* portable audio mixing module 140*a* is not connected to Local User 2's 100*b* portable audio mixing module 140*b*, neither user will hear Local User Chat C or D, through their respective headset 160*a*, 160*b* until it is received at the network 110 and sent back to each user as Network Chat B.

PC/PS3 Mode

Figure 2:
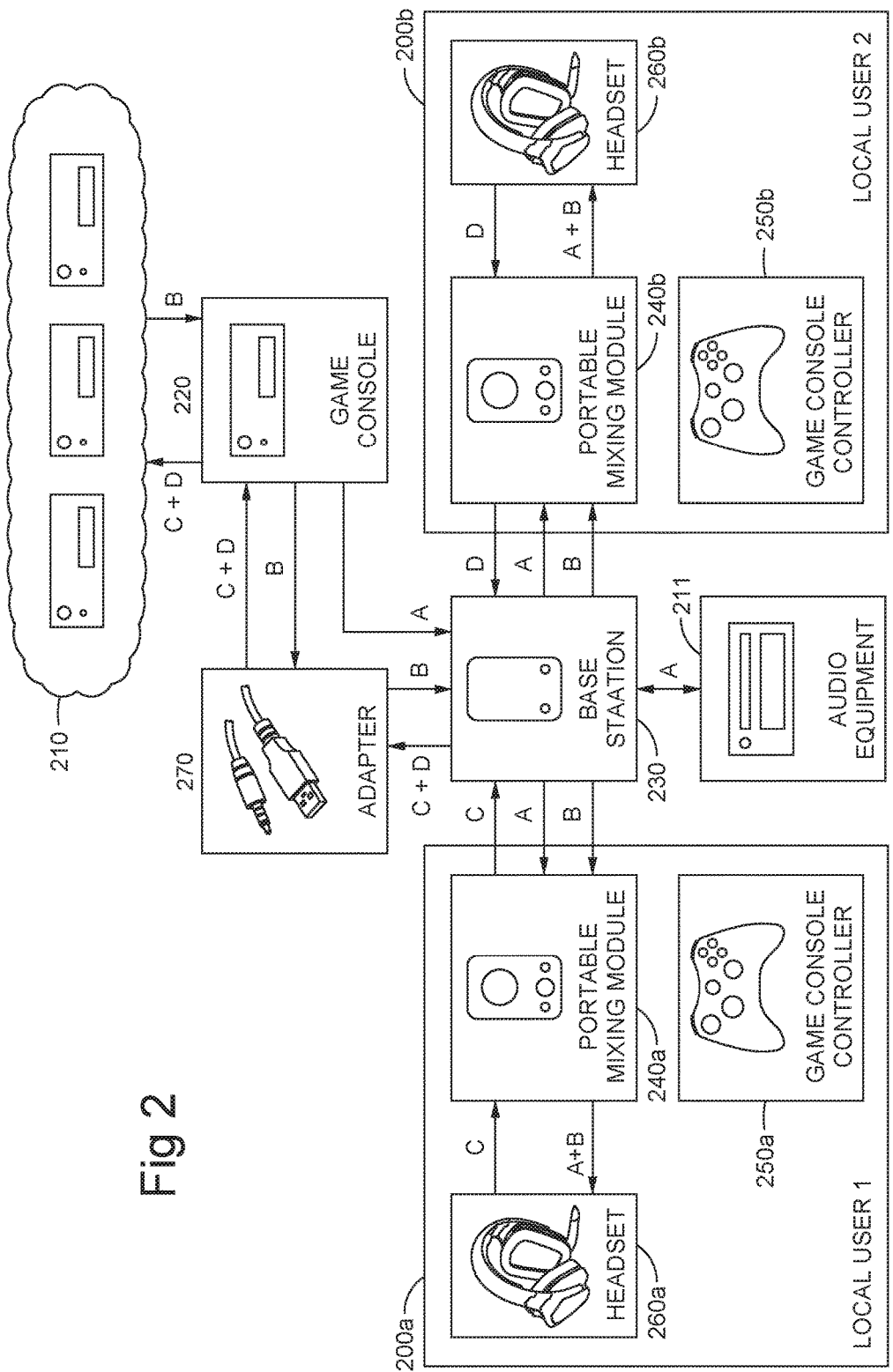
FIG. 2 shows a system architecture according to an exemplary embodiment.

Referring now to FIG. 2, an exemplary system is shown, wherein multiple gamers 200*a*, 200*b* may listen to both Game Audio A and Network Chat B from a game console 220 using a headset 260*a*, 260*b*, without the need for the headset to be connected directly to the game console 220. Further, the depicted system allows multiple gamers 200*a*, 200*b* to socially interact with other gamers over a network 210 by using the microphone of their headsets 260*a*, 260*b*, such that the Local User Chat C, D will propagate through the system to the networked users. As shown, a first user 200*a* and a second user 200*b* may both play the same game on the same gaming console 220 simultaneously and/or independently.

A game console 220 may be connected to a network 210 by any means known in the art, such as through a physical Ethernet connection or through a wireless connection. In this particular embodiment, the users 200*a*, 200*b* may be playing a game on a PlayStation 3® 220, which is connected to multiple other consoles through the PlayStation Network® 210. Alternatively, the users 200*a*, 200*b* may be playing a game on a personal computer, which is connected to multiple other personal computers through the internet. In order to operate the gaming console 220, each gamer 200*a*, 200*b* may utilize a gaming console controller 250*a*, 250*b*, which is connected to the gaming console via either a wired or wireless connection.

Receiving Game Audio and Network Chat

The gaming console 220 may be electrically connected to a base station 230 such that the base station may receive Game Audio A in a digital form from the gaming console 220. The base station 230 may be connected to the gaming console 220 via any means known in the art, such as but not limited to, a TOSLINK® optical cable, an HDMI® cable, and/or any coaxial-type digital audio cables. As described in further detail below, in the embodiment shown, the base station 230 may receive Game Audio A from the gaming console 220 to wirelessly transmit to a portable audio mixing module 240a, 240b of a user 200a, 200b.

In the pictured embodiment, both users 200a, 200b are in possession of a portable audio mixing module 240a, 240b, and both of the portable audio mixing modules 240a, 240b are wirelessly connected to the base station 230. In the embodiment shown, the portable audio mixing modules 240a, 240b are not inter-connected to each other—all portable audio mixing modules 240a, 240b are connected to the base station 230. Notably, in this particular embodiment, the portable audio mixing module 240a, 240b is not necessarily connected to the game console controller 250a, 250b. However, a headset 260a, 260b is connected to each portable audio mixing module 240a, 240b via, for example, a cable with a standard 3.5 mm adapter.

As shown, Game Audio A may originate at the game console 220 when a user 200a, 200b starts up the console and plays a media type. Once produced by the game console 220, the Game Audio A may be transmitted therefrom and received by the base station 230. As described above, the base station may then transmit the Game Audio A to the portable audio mixing module 240a, 240b of a user.

Certain embodiments provide that, if the game console 220 is connected to a network 210, Network Chat B may be received by the game console 220 from the network 210. In the particular embodiment shown, however, the Network Chat B will not be sent through an external game console controller 250a, 250b as described above, and so must be handled by other components of the system. In these embodiments, the base station 230 may receive the Network Chat B from the game console 220 and transmit the same wirelessly to the portable audio mixing module 240a, 240b.

In one embodiment, a PC/PS3 adapter 270 may be electrically attached to both the base station 230 and the game console 220 such that the base station may receive the Game Network Chat B from the game console through the PC/PS3 adapter 270. Once received, the base station 230 may then transmit both the Network Chat B to each portable audio mixing module 240a, 240b connected thereto.

The PC/PS3 adapter 270 may be operable to convert audio streams/signals from analog to digital (A/D) or from digital to analog (D/A) such that a digital audio signal from a gaming console 220, such as Network Chat B may be converted to an analog signal before being turned back into digital then transmitted to the portable audio mixing module 240a, 240b, and/or an analog signal received by the base station 230, such as Local User Talk C, D, may be converted to a digital signal before being transmitted to the gaming console 220. Exemplary embodiments of a PC/PS3 adapter 270 are described below. It will be appreciated that the PC/PS3 adapter 270 may be external to the base station 230 or internal to the base station 230, and that, in certain embodiments, a conversion of a signal such as Network Chat B from digital to analog mayor may not be necessary.

Although the base station 230 may receive one audio signal/stream through a PC/PS3 adapter, such as the Network Chat B, the base station may also receive a different audio/signal stream directly from the game console 220. Therefore, in one embodiment, the Network Chat B may travel from the game console 220 through the PC/PS3 adapter 270 to the base station 230, while the Game Audio A may travel from the game console 220 directly to the base station 230 through, for example, a TOSLINK® optical cable.

Once the Game Audio A and/or the Network Chat B are transmitted by the base station 230 to the portable audio mixing module 240a, 240b the two streams/signals may be mixed together and transmitted to each headset 260a, 260b as a single, blended audio output stream A+B (discussed in detail below). It will be appreciated that the Game Audio A and Network Chat B may be sent and received by individual components of the exemplary system both independently of each other and/or simultaneously. Moreover, it will be appreciated that all local users 200a, 200b receive the same Game Audio A and Network Chat B streams at their respective portable audio mixing modules 240a, 240b.

Moreover, it will be noted that, when the game console controller 250a, 250b is not utilized to send or receive Network Chat B, any game console controller capable of controlling the game console 220 may be used. For example, the system may be used with a guitar-type controller used for music games and/or a gun-type controller used for hunting games. It will also be appreciated that the systems and methods described herein are also compatible with any type of controller that can transmit and receive Network Chat B.

Sending Local User Chat

In certain embodiments, a user's headset 260a, 260b may comprise a microphone such that the user 200a, 200b may socially interact with other gamers over a network 210. Embodiments of the present invention may allow multiple local users 200a, 200b to socially interact with networked users simultaneously and/or independently.

For example, Local User 1 200a may talk into the microphone to produce Local User 1 Chat C. Local User 1 Chat C may be transmitted from User 1's headset 260a to the connected portable audio mixing module 240a, where it is wirelessly transmitted to the base station 230. Upon receiving the Local User 1 Chat C, the base station 230 may transmit the stream through the PC/PS3 adapter 270 where it may be received by the game console 220. Finally, the game console 220 may transmit the Local User 1 Chat C over the network 210, where it may be incorporated into the Network Chat B stream and sent to all networked users.

Similarly, if Local User 2's 200b headset 260b includes a microphone, Local User 2 may speak into the microphone to produce Local User 2 Chat D. Although Local User 2 Chat D will propagate through the system in a similar way as Local User 1 Chat C, it will be noted that, because Local User 1's 200a portable audio mixing module 240a is not connected to Local User 2's 200b portable audio mixing module 240b, neither user will hear Local User Chat C or D.

Portable Audio Mixing Module

Figure 3A:
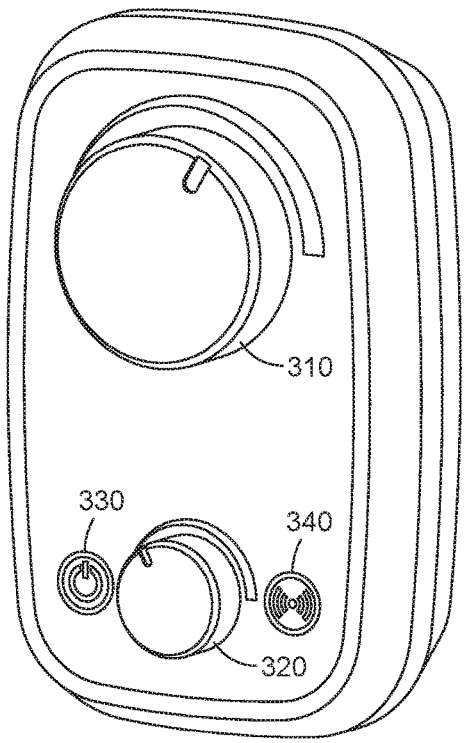
FIG. 3a illustrates a front-end view of an exemplary embodiment of a portable audio mixing module.
Figure 3B:
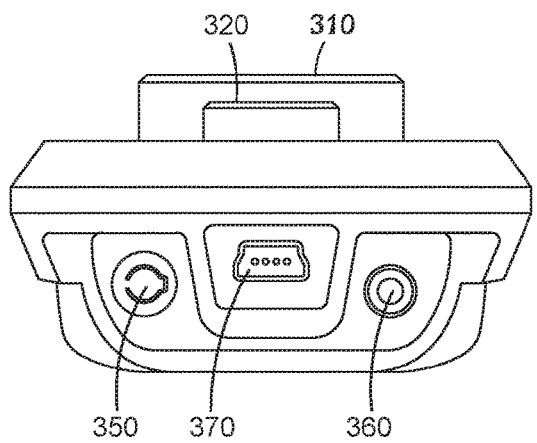
FIG. 3b illustrates a bottom-end view of an exemplary embodiment of a portable audio mixing module.
Figure 4:
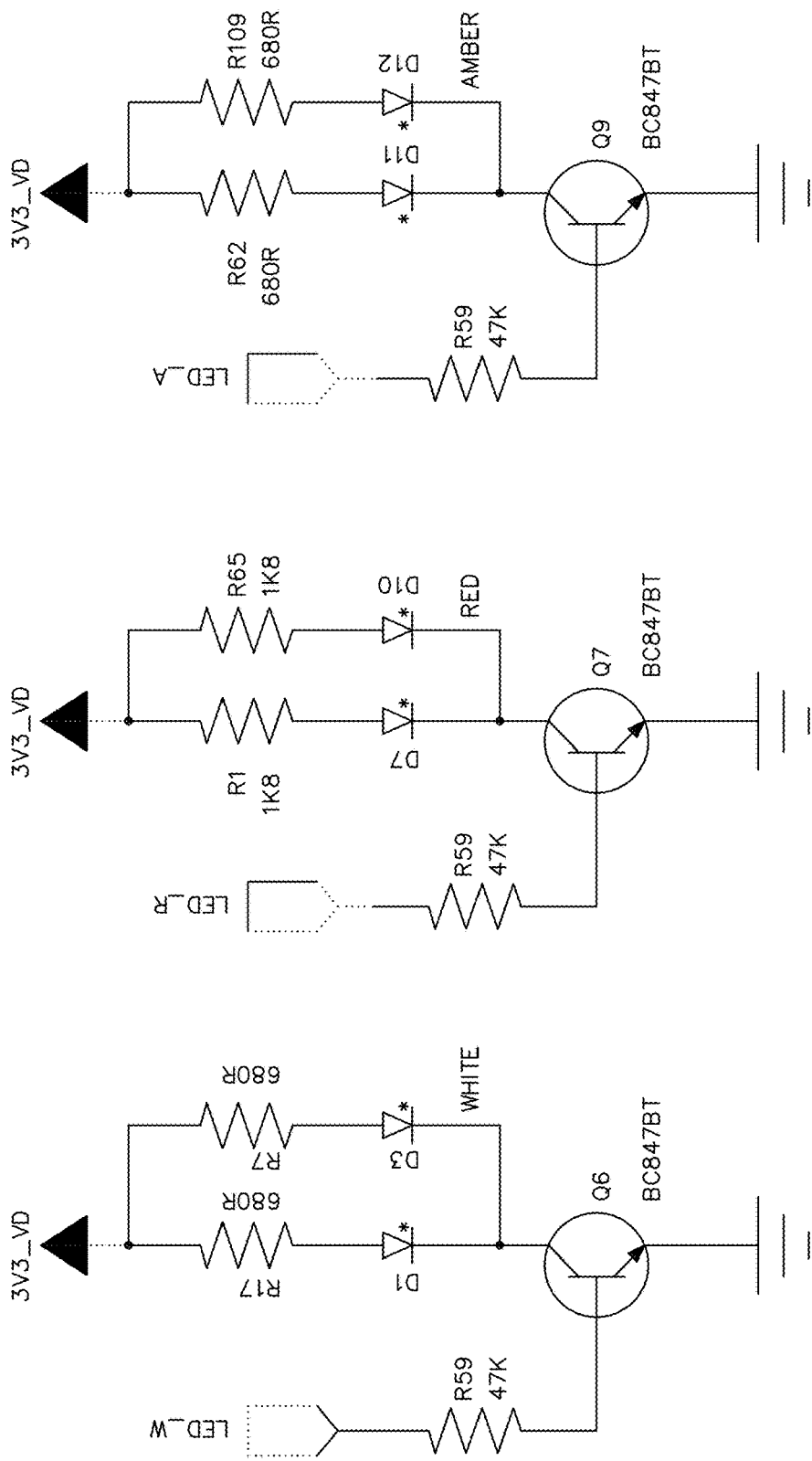
FIG. 4 is a circuit diagram illustrating exemplary circuitry of an embodiment of a portable audio mixing module.

An embodiment of a portable audio mixing module according to the invention will now be described. FIGS. 3a and 3b illustrate a front-end view and bottom-end view of an exemplary embodiment of a portable audio mixing module, respectively. FIGS. 4 through 14b illustrate exemplary portable audio mixing module circuitry that may be electrically connected to form a single embodiment. All details of the circuitry are not explicitly discussed herein as resulting functionality, connections and inputs/outputs are apparent from the drawings and necessarily result from the combination of components. Further, sections of the representative circuits are described in co-pending, commonly owned U.S. patent application Ser. No. 12/047,260, titled "Daisy-Chained Game Audio Exchange," which is incorporated by reference herein.

FIG. 3a illustrates a front-end view of an exemplary embodiment of a portable audio mixing module according to the invention. As shown, the portable audio mixing module may comprise a pairing/power button 330, which may be pressed by a user to power the portable audio mixing module on and off. The pairing/power button 330 may be electrically connected to an LED or similar circuitry (see FIG. 4) such that the power status of the portable audio mixing module may be indicated to a user. For example, the pairing/power button 330 may illuminate when the portable audio mixing module is turned on, flash a first color when the battery power is low, display a second color when the battery is charging, and/or darken when the portable audio mixing module is turned off. In certain embodiments, a user may check the amount of battery power left in a battery by quickly pressing the pairing/power button 330.

In some embodiments, the portable audio mixing module may automatically connect or "pair" to a base station when powered on. In other embodiments, a user may press the pairing/power button 330 for a period of time in order to set the portable audio mixing module into discovery mode. Once in discovery mode, the portable audio mixing module may be paired to a base station, which is also in discovery mode. The pairing/power button 330 may also be electrically connected to an LED (see FIG. 4) or similar circuitry such that pairing status of the portable audio mixing module may be indicated to a user. In one embodiment, a user may hold the pairing/power button 330 for an amount of time, and the LED may begin to blink to indicate that the portable audio mixing module is in discovery mode. Once the portable audio mixing module is paired to a base station, an LED of a pairing/power button 330 may remain illuminated. To unpair the portable audio mixing module from the base station, the user may hold down the pairing/power button 330 again. Although shown as a single button, in one embodiment, the pairing/power button 330 may be two separate buttons; one button may control power and one button may control pairing.

Often, gamers may gather together in a single room with multiple gaming consoles to play a single game, or may link multiple-consoles together in, for example, a LAN to play the same game. The present system allows for both of these scenarios, as one group of portable audio mixing modules paired with a base station will not interfere with a second set of portable audio mixing modules paired to a different base station. This feature prevents interference even if the groups are operated in a small space, such as a single room. In fact, it is contemplated that 2,4,6,8, 10, 12, 14, and even 16 gaming consoles may each be connected to a different base station and operated in the same room with up to four portable audio mixing modules per base station without experiencing any audio interference problems.

As shown, a number of adjustment means, such as but not limited to knobs and/or buttons are accessible to a user of the portable audio mixing module to allow a user to adjust properties of a blended audio output stream that may be transmitted from the portable audio mixing module to a headset of the user (discussed below). Exemplary properties include but are not limited to balance and/or volume of a Game Audio and/or a Network Chat audio stream. In one embodiment, a volume control knob 310 on the portable audio mixing module allows for user adjustment of the volume level of a blended output audio stream transmitted to a user's headset. A balance control knob 320 may further allow for user adjustment of balance between the Game Audio and Network Chat audio streams. Therefore, in certain embodiments, a user may turn the balance control knob 320 to specify how much of the audio information coming from a Network Chat or Game Audio streams should be represented to the user's headset. In certain embodiments, it is possible to turn either the Game Audio or Network Chat to any volume levels up to and including 0% to 100% for either source.

Figure 12:
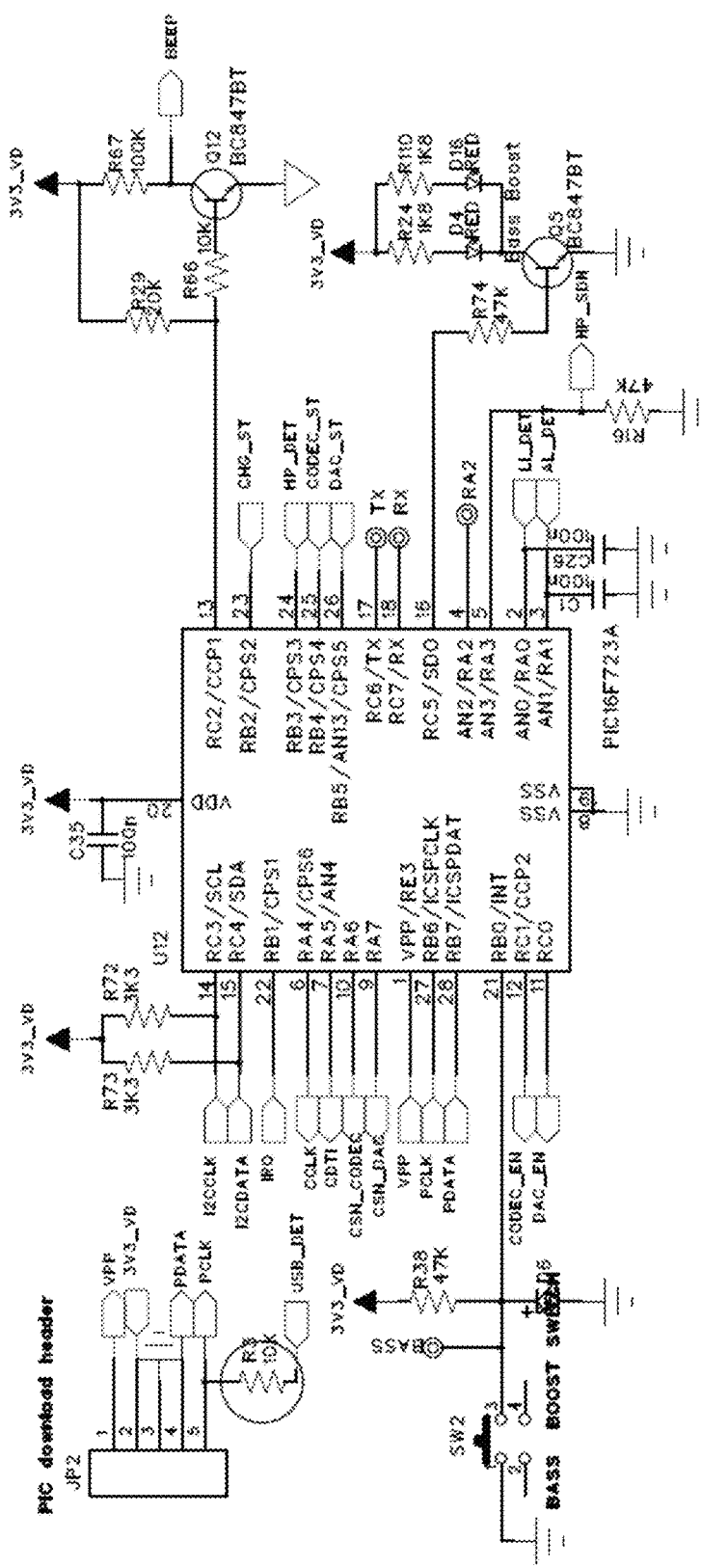
FIG. 12 is a circuit diagram illustrating exemplary circuitry of an embodiment of a portable audio mixing module.

In one embodiment, the portable audio mixing module may comprise a bass boost button 340 which may control a bass boost feature. By pressing the bass boost button 340 a user may toggle a bass boost feature of the portable audio mixing module, wherein low-end frequencies of the incoming signal may be increased before being transmitted to the user. The bass boost button 340 may also be connected to an LED or similar circuitry, such that the button may be illuminated when the bass boost feature is turned on. Exemplary bass-boost circuitry, along with an exemplary microcontroller is illustrated in FIG. 12.

Figure 9:
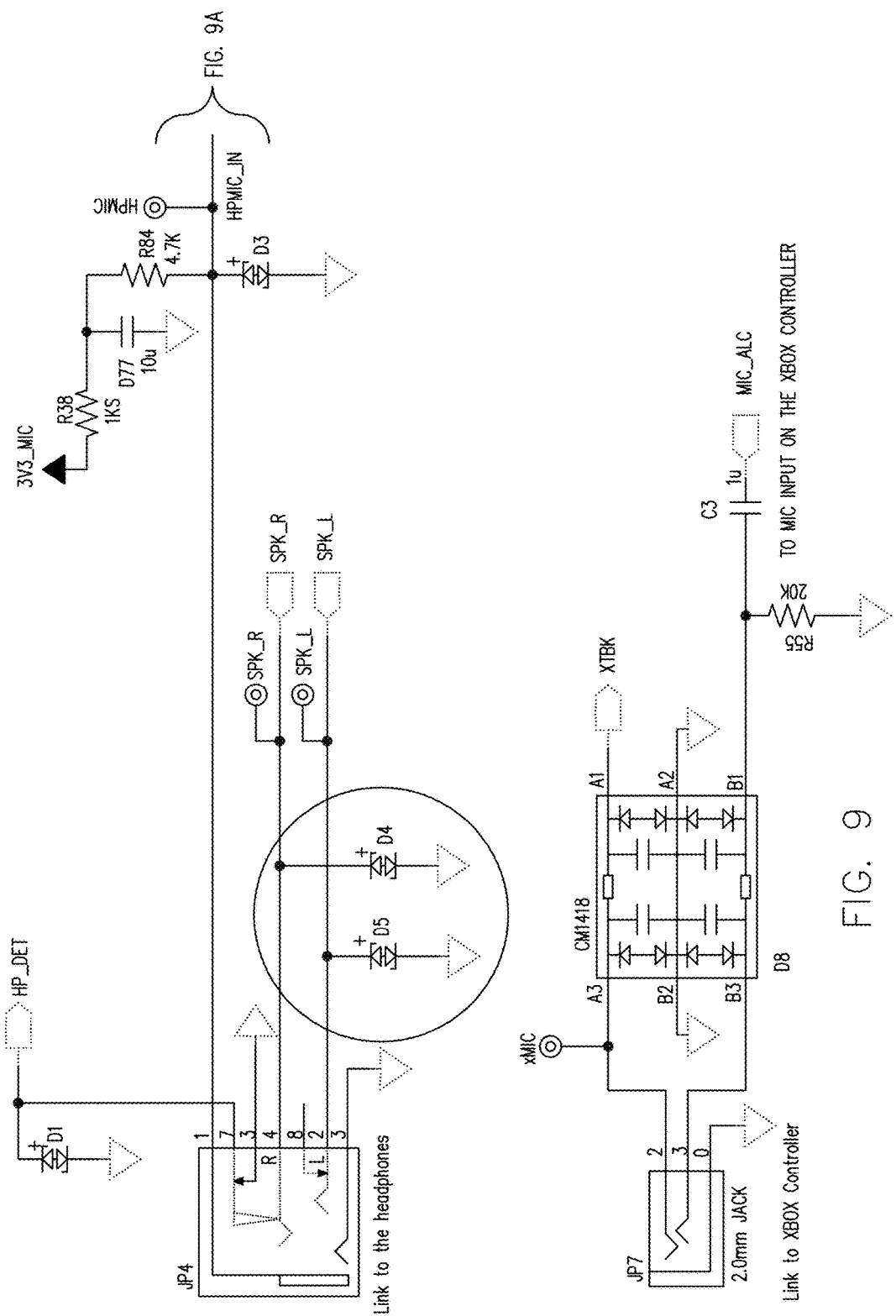

FIG. 3b illustrates a bottom-end view of an exemplary portable audio mixing module. In this exemplary embodiment, the portable audio mixing module has a number of input/output ports: a headset jack 350 (FIG. 9 at JP4), a power jack 360 (FIG. 6 at JP5), and a game console controller jack 370 (FIG. 9 at JP7). In one embodiment, the portable audio mixing module comprises a headset jack 350, which may be adapted to transmit a blended audio output stream to the headphones of a headset of a user and receive Local User Talk from a microphone of the headset. As shown, the headset jack 350 may comprise a 3.5 mm, four-pole jack, although the headset jack is not so limited and may comprise any other size jack.

An exemplary embodiment of a portable audio mixing module may also comprise a game console controller jack 370 (FIG. 9 at JP7) that may receive an audio stream from an audio source, such as Network Chat from a gaming console controller and may transmit an audio stream, such as Local User Chat from a user. Preferably, the game console controller jack 370 may be formed from a 2.5 mm, three-pole jack, such that a game console controller, such as but not limited to an Xbox 360® controller, may be connected thereto via, for example, a wire. It will be appreciated that the game console controller jack 370 may comprise any size jack (e.g., 3.5 mm) and any audio source may be connected thereto, including but not limited to smart phones and other portable digital media players. Moreover, the portable audio mixing module may be capable of mixing the audio source connected to the game console controller jack 370 with another audio source received from a base station, such as Game Audio.

Figure 5:
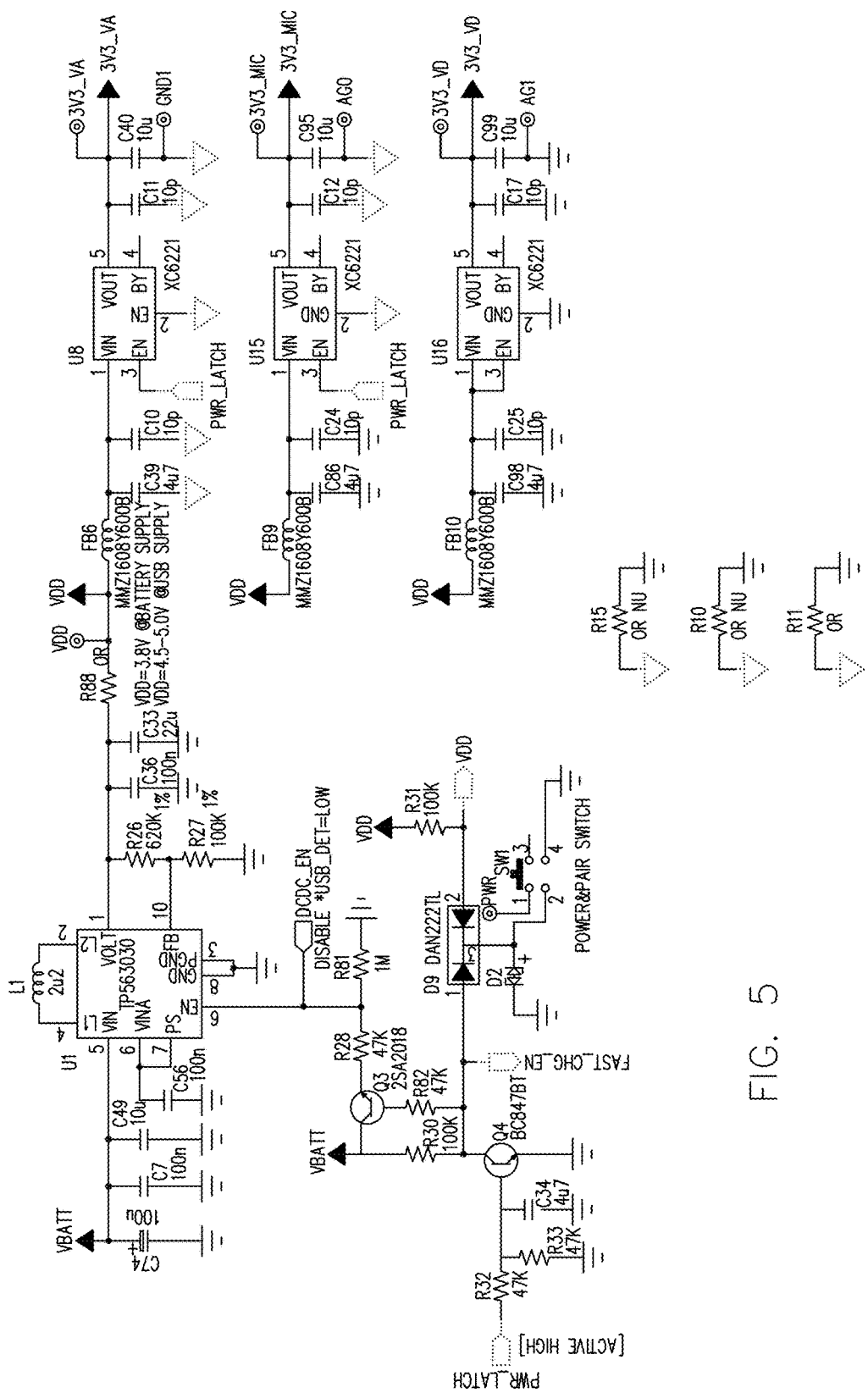
FIG. 5 is a circuit diagram illustrating exemplary circuitry of an embodiment of a portable audio mixing module.
Figure 6:
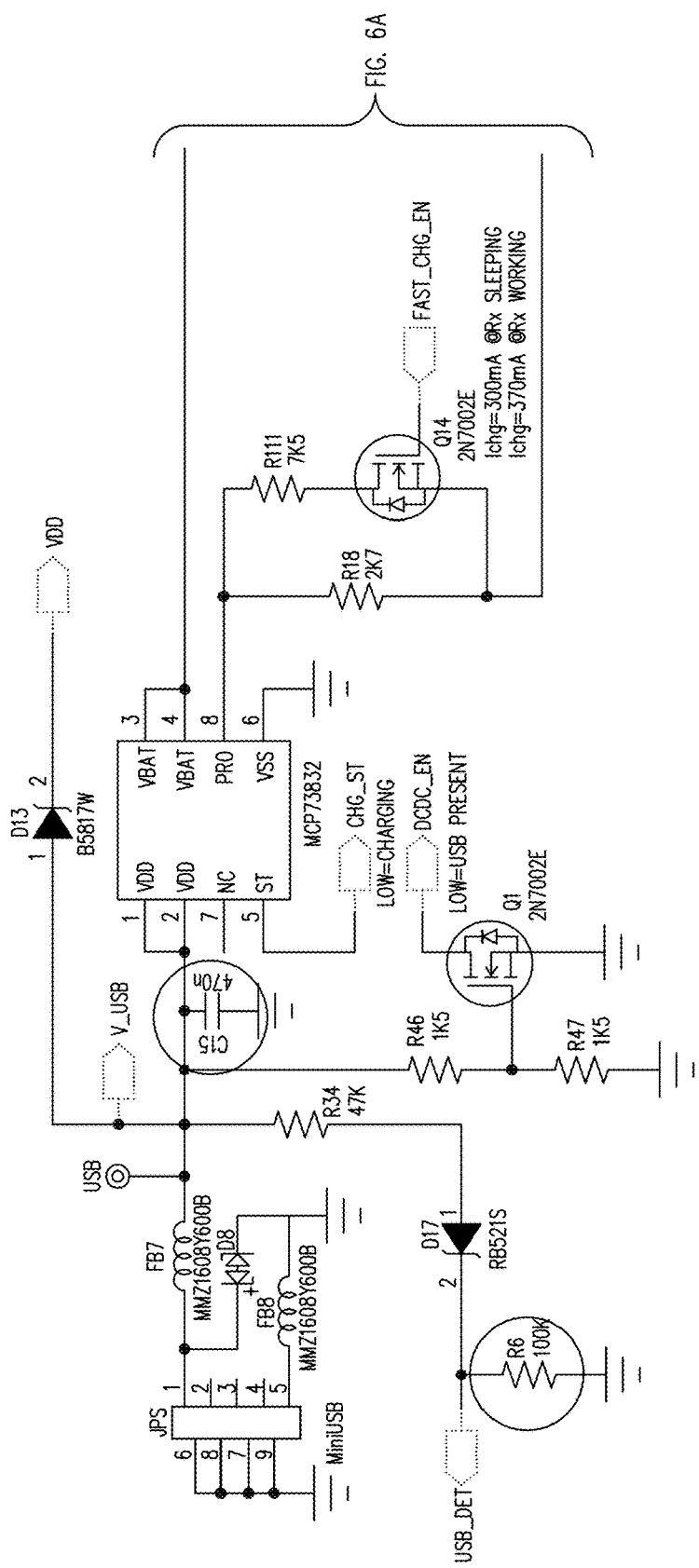
FIGS. 6 and 6A are a circuit diagram illustrating exemplary circuitry of an embodiment of a portable audio mixing module.
Figure 6A:
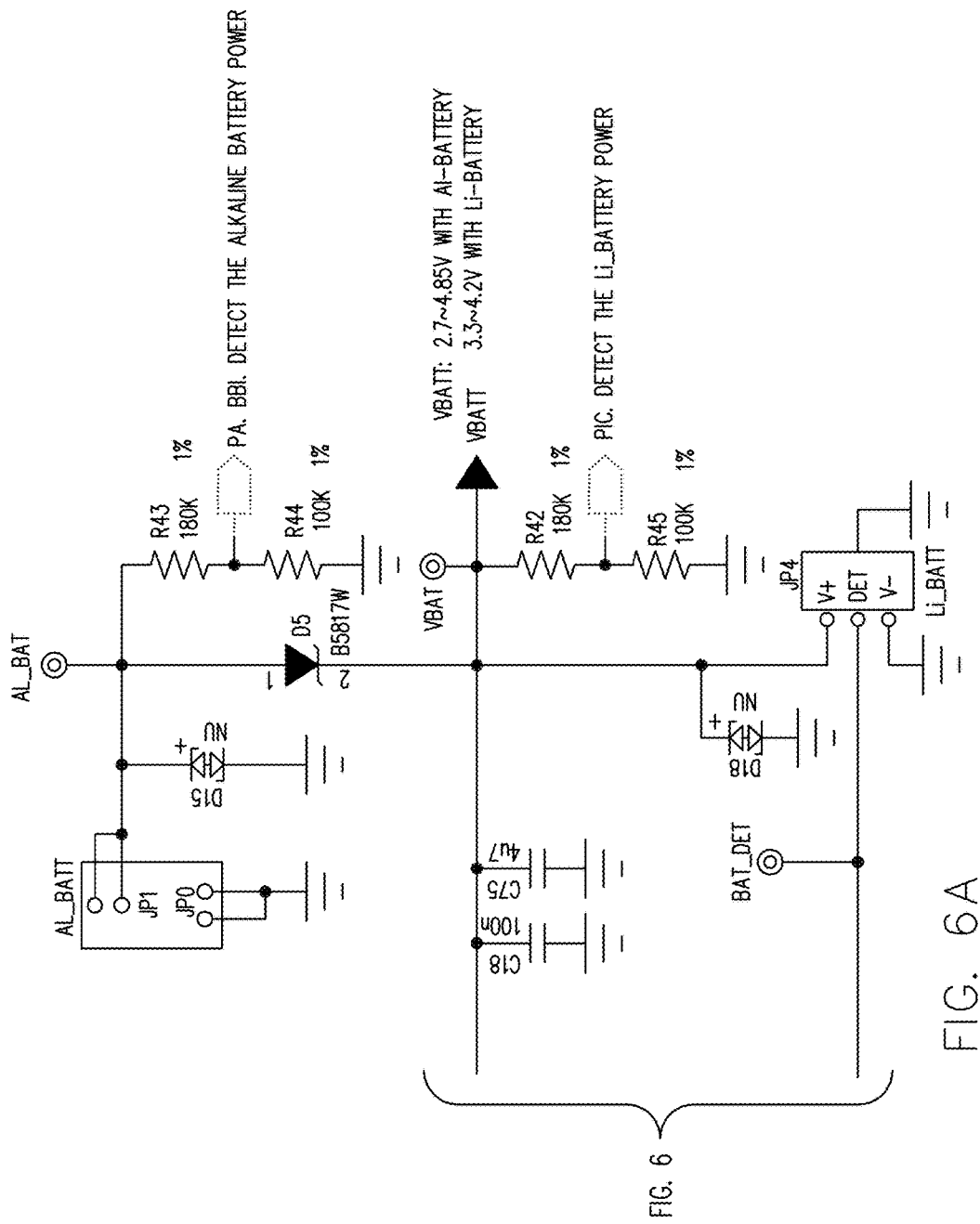

The portable audio mixing module may be powered by any means known in the art, including but not limited to disposable and/or rechargeable batteries. For example, 1, 2, 3 or 4 AAA alkaline batteries or a rechargeable lithium ion battery may be employed within a housing of the portable audio mixing module. In the case of the lithium ion battery, such a battery may be charged without removing the battery from the portable audio mixing module unit by connecting a power jack 360 of the portable audio mixing module to an external power source, such as a wall-mounted USB charger via a USB cable. In certain embodiments, such a battery may be charged by plugging one end of a USB cable into the power jack 360 and the other end of the cable into the USB port of a base station unit or a user's computer. Exemplary power circuitry is shown in FIG. 5 and exemplary circuitry for connecting power to the power jack 360 (FIG. 9 at JP7) is shown in FIG. 6.

In one embodiment, the portable audio mixing module may be locally mounted on the user's person via a clip or other temporary fastening means. In an alternative embodiment, the Rx may be detachably fastened to a console controller.

In one embodiment, the portable audio mixing module may detect the presence of a headset plugged into the headset jack. When the headset is disconnected from the portable audio mixing module, the portable audio mixing module may automatically shut down if the headset is not re-connected within a certain amount of time. In certain embodiments, the amount of time within which to reconnect the headphone may be 1 second, 5 seconds, 10 seconds, 15 seconds 30 seconds or 1 minute.

Figure 7A:
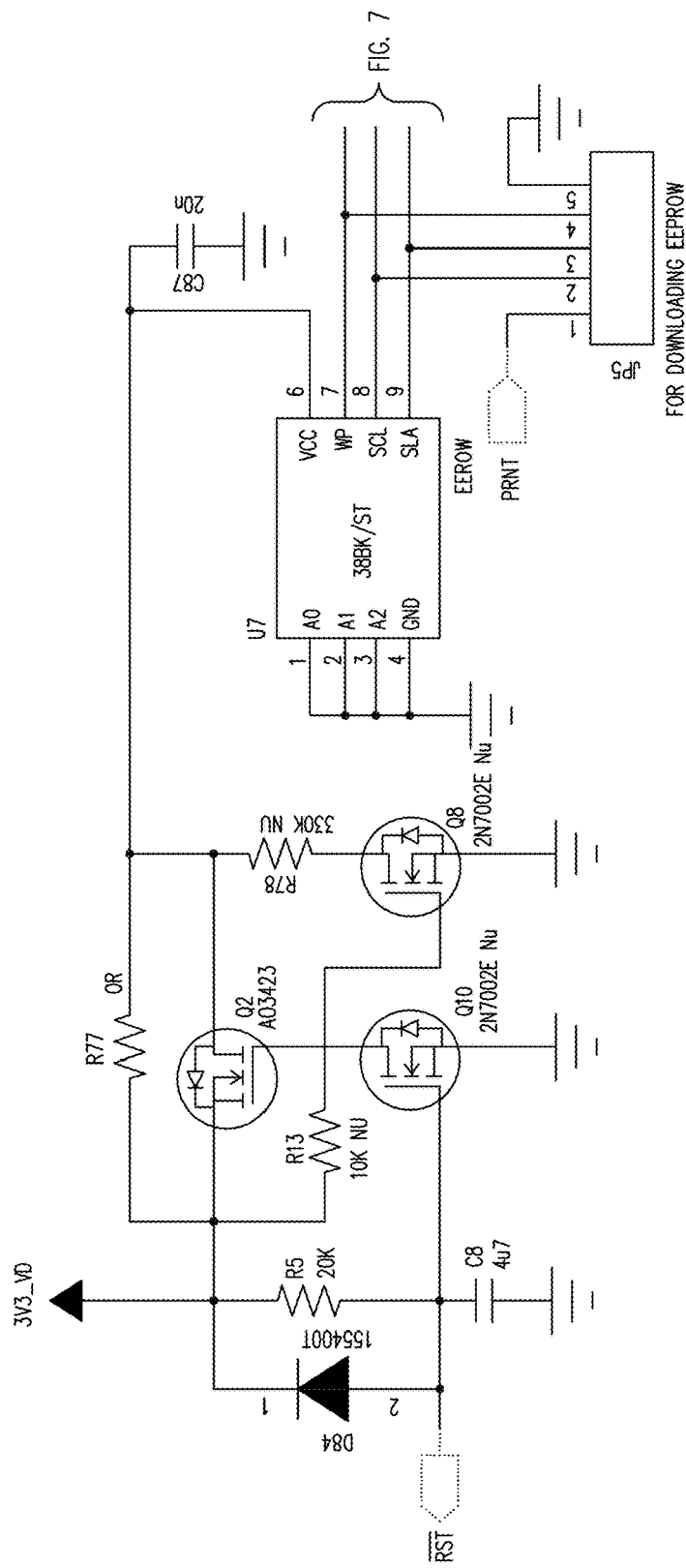
Figure 7B:
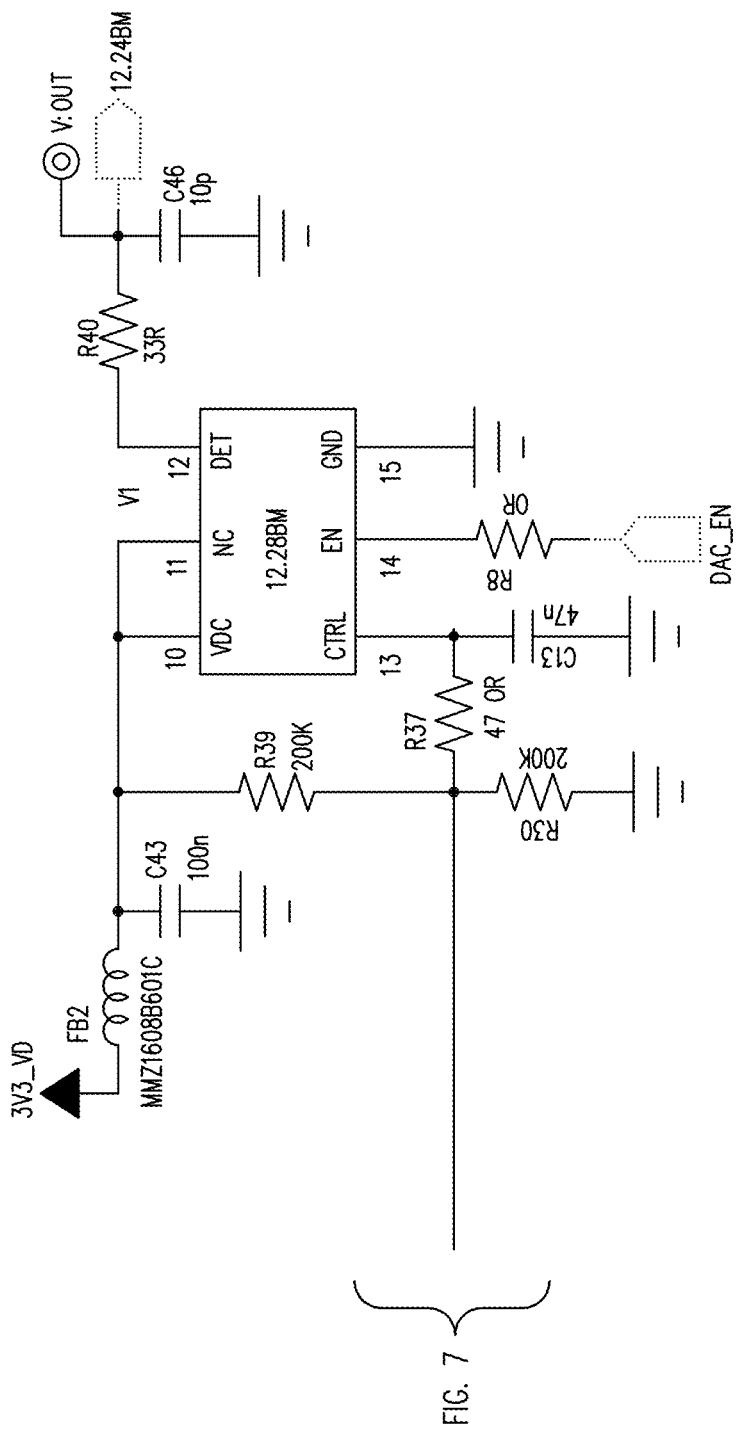

An exemplary path of a Game Audio signal/stream through the portable audio mixing module will now be described. Referring first to FIG. 7, Game Audio may be received from a base station via, for example, a wireless transmitter/receiver JP3. The wireless transmitter/receiver JP3 may be capable of both receiving and transmitting digital audio signals at any frequency known in the art, but must be compatible with a separate wireless transmitter/receiver (not shown) located at the base station. Preferably, the wireless transmitter/receiver JP3 operates at spectrum of about 5.8 GHz. In one embodiment, the wireless transmitter/receiver JP3 may be industry part no. DWAM82. In the exemplary embodiment shown, Game Audio may be sent from the wireless transmitter/receiver JP3 along, for example, a wire (pin 26 (SDIO_W), wire e).

Figure 8:
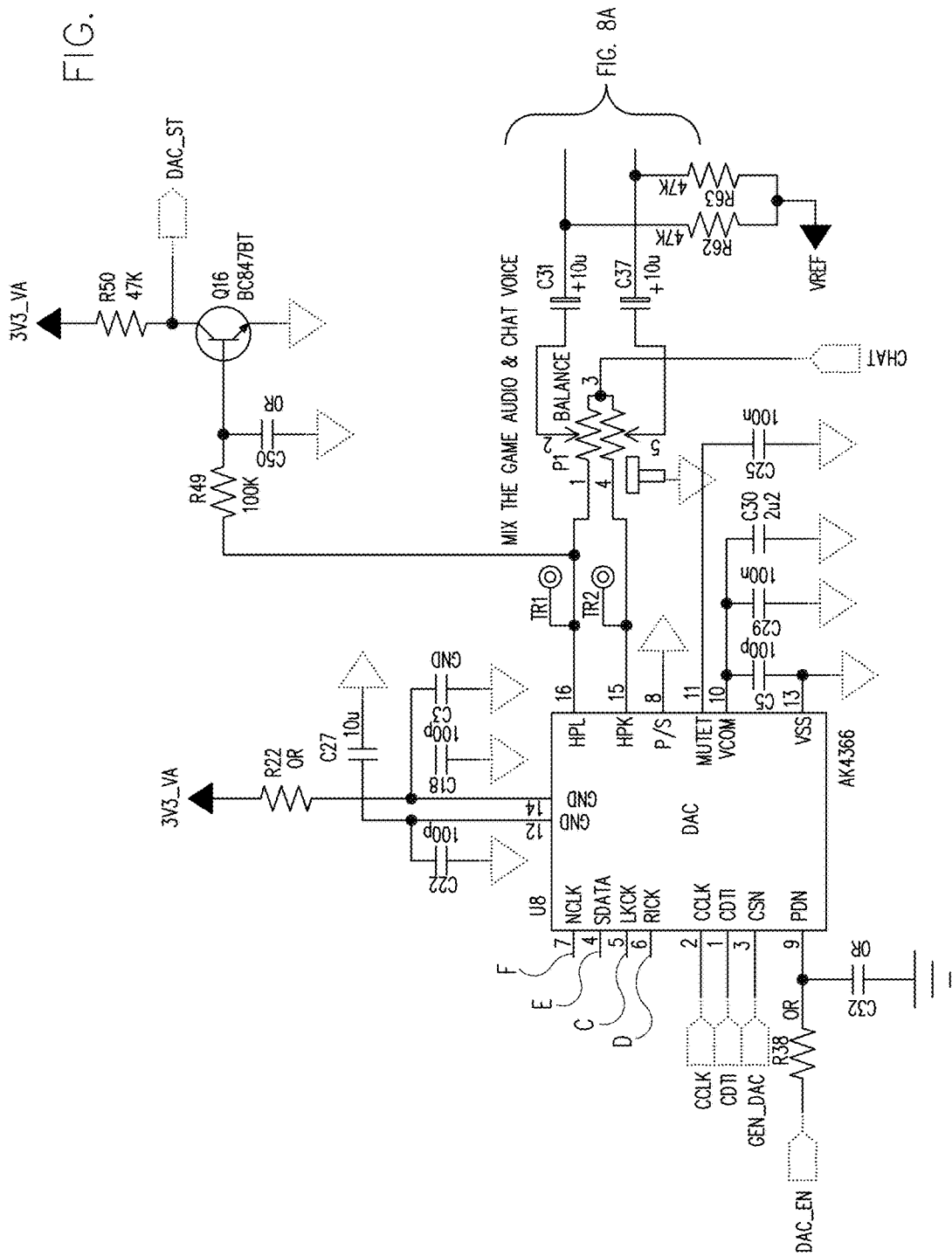
FIGS. 8 and 8A are a circuit diagram illustrating exemplary circuitry of an embodiment of a portable audio mixing module.
Figure 8A:
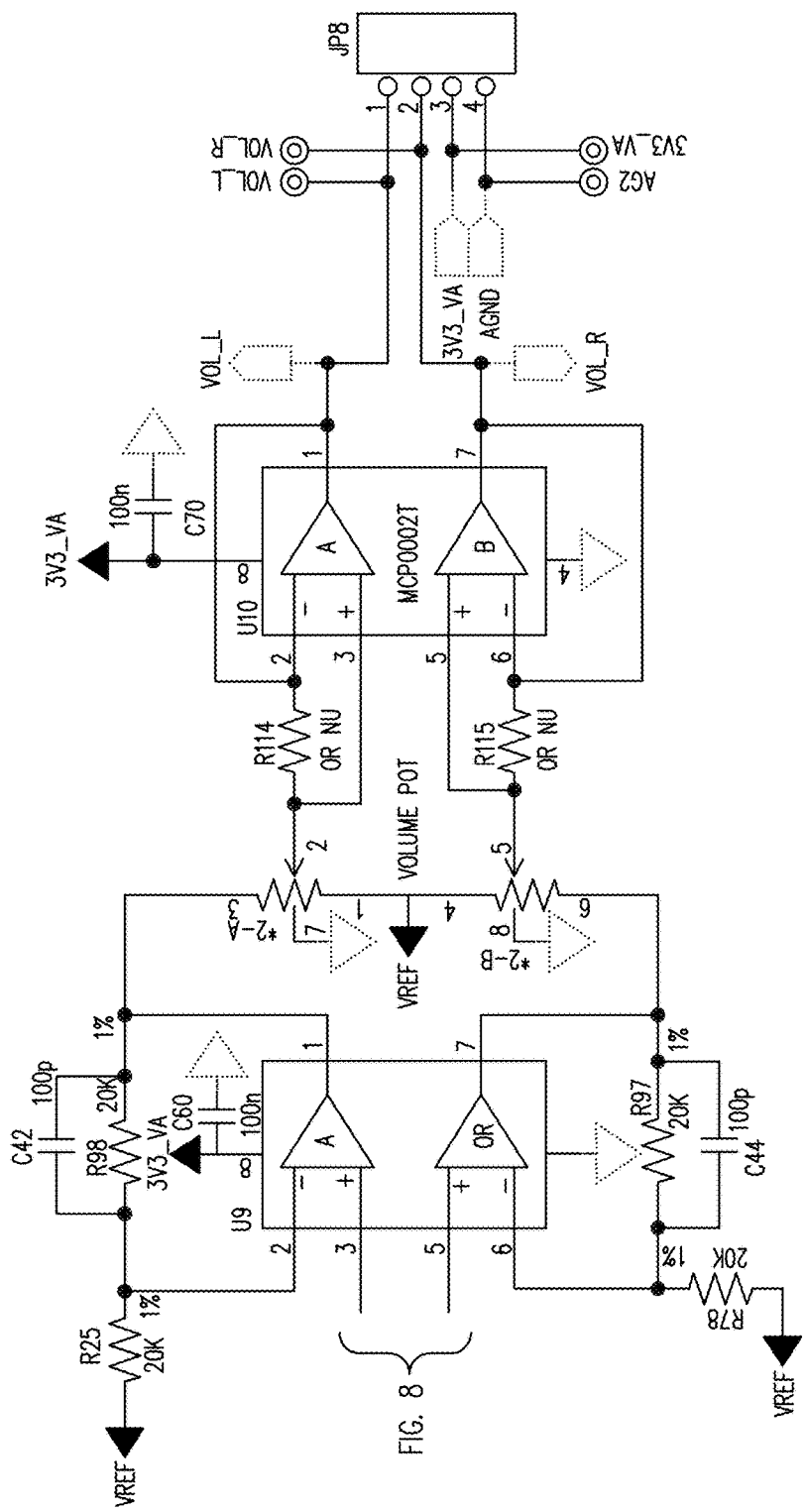

Referring to FIG. 8, the Game Audio stream may be converted from a digital form to an analog form, for example, by presenting the Game Audio to a digital-to-analog converter U9 (pin 4 "SDATA"). In one embodiment, the digital-to-analog converter U9 may be industry part no. AK4366.

Digressing, an exemplary path for Network Chat is now described. As discussed above, in certain embodiments, a Network Chat stream may be received from a game console controller. Referring to FIG. 9, a game console controller may be connected to the portable audio mixing module at, for example, a game console controller jack JP7 (FIG. 3 at 370) such that Network Chat XTBK may be provided therefrom. Although the Network Chat XTBK is shown as being received from a physical connection between the portable audio mixing module and a game console controller, it will be appreciated that, in other embodiments, the portable audio mixing module may receive Network Chat XTBK through a wireless connection to a game console controller. It will be noted that the game console controller jack JP7 may also be capable of receiving a second audio stream, such as but not limited to a Local User Chat audio stream MIC_ALC (discussed in detail below).

Figure 10:
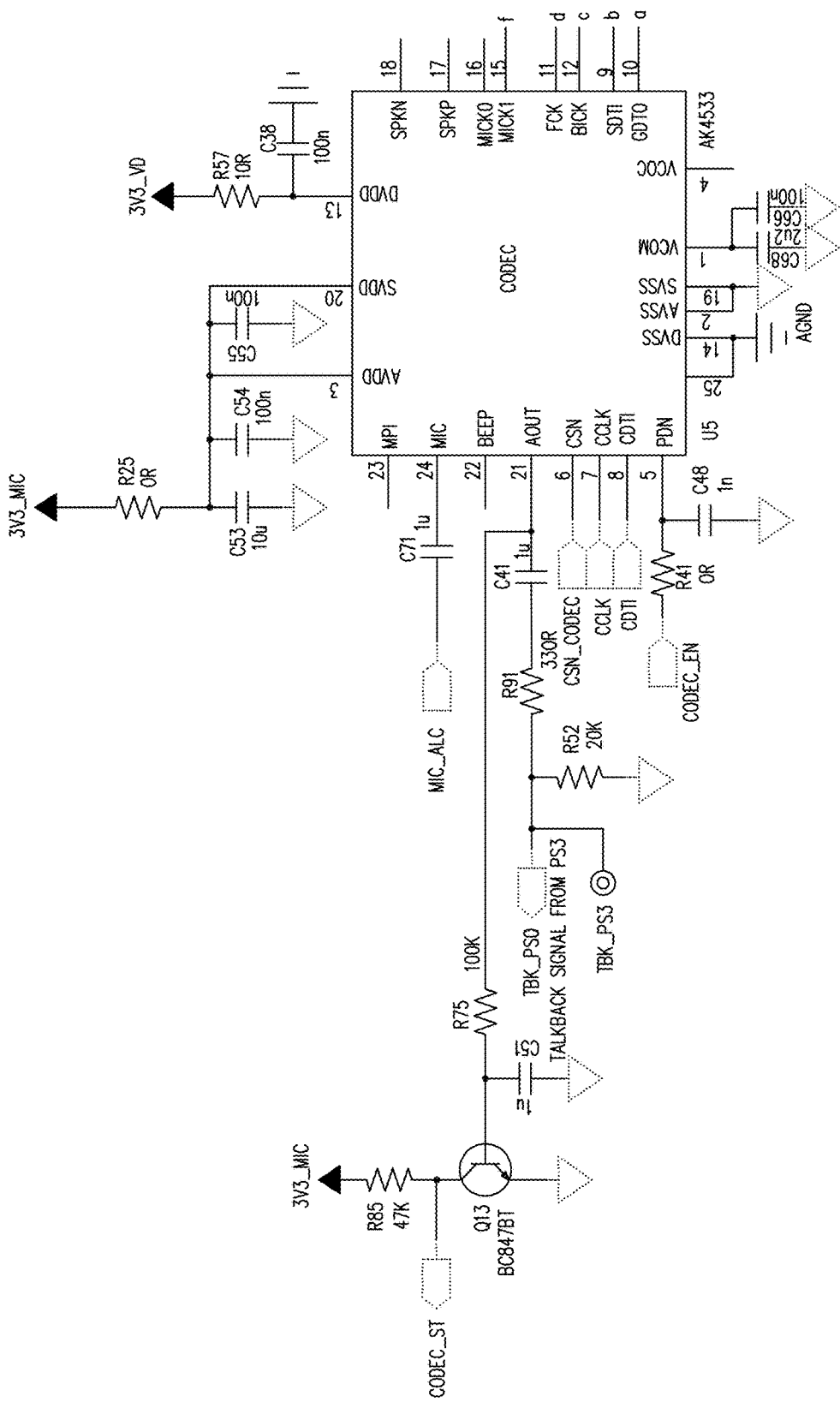
FIG. 10 is a circuit diagram illustrating exemplary circuitry of an embodiment of a portable audio mixing module.

In an alternative embodiment, a Network Chat stream may be received from a base station, rather than from a game console controller. Referring back to FIG. 7, Network Chat may be received in a digital form from a base station by a wireless transmitter/receiver JP3 connected thereto. The Network Chat may then be transmitted from the wireless transmitter/receiver JP3 (pin 21 (SDIO_X), wire b). As shown in FIG. 10 the digital Network Chat stream may propagate along a wire (b) connected to the transmitter/receiver (FIG. 7 at JP3) such that it may be received at a device capable of encoding and/or decoding the audio stream, such as a CODEC U6 (pin 9 (SDTI), wire b shown in FIG. 10). In one embodiment, the CODEC U6 may prepare the Network Chat such that the Network Chat TBK_PS3 may be further modified.

Figure 11:
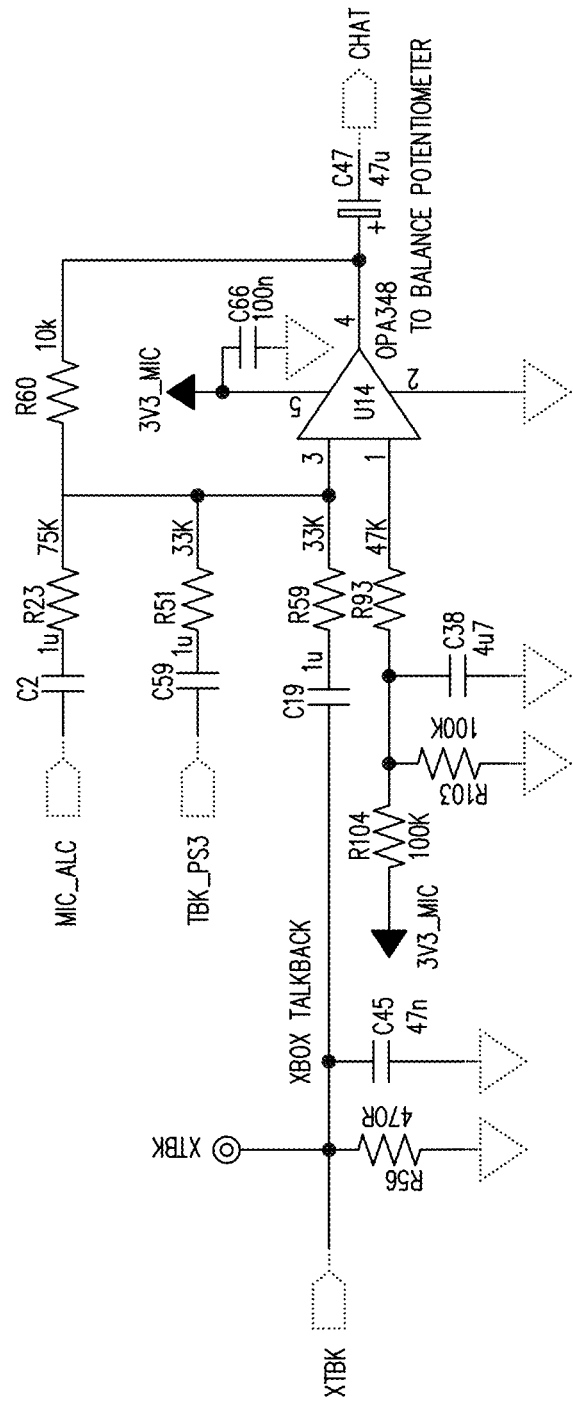
FIG. 11 is a circuit diagram illustrating exemplary circuitry of an embodiment of a portable audio mixing module.

Referring now to FIG. 11, whether the Network Chat TBK_PS3, XTBK was received by the portable audio mixing module from a base station TBK_PS3 or from a game console controller XTBK, the Network Chat TBK_PS3, XTBK may enter a gain circuit such that it may be amplified before entering a balance potentiometer. The amplified Network Chat CHAT is then sent to be mixed with the Game Audio stream discussed above.

Figure 13:
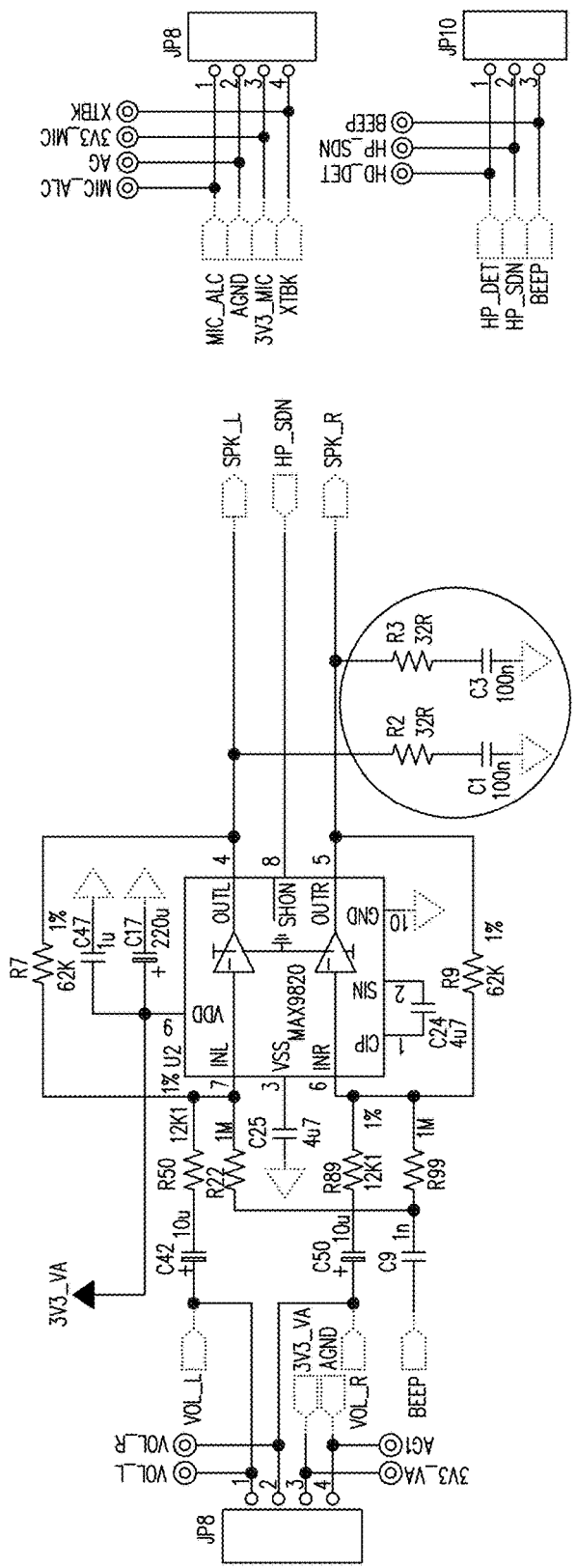
FIG. 13 is a circuit diagram illustrating exemplary circuitry of an embodiment of a portable audio mixing module.
Figure 13:
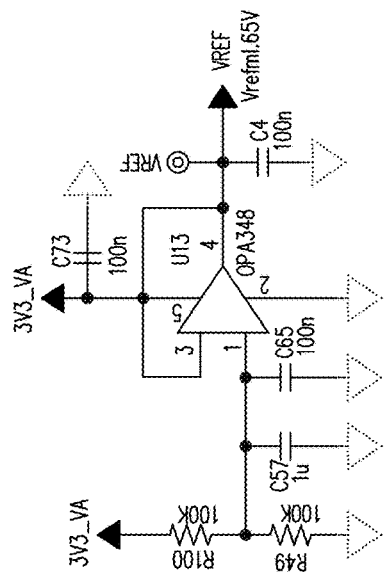

Referring back to FIG. 8, mixing circuitry, balance circuitry and volume circuitry are shown wherein the portable audio mixing module may blend Network Chat CHAT and Game Audio (pin 15 and 16 from U9) into a single blended audio output stream to be output to a user through a headset jack JP8 (pin 1 and 2). The user may adjust the balance between both the Network Chat CHAT and Game Audio (pin 15 and 16 from U9) streams, along with the volume of the blended audio output stream. For example, the user may adjust the balance such that only Network Chat is audible, only Game Audio is audible, or such that any combination of Network Chat and Game Audio is audible. As shown in FIG. 9, the blended audio output stream, in analog form SPK_R, SPK_L, may be output to a user's headset via the headset jack JP4. Further, as shown in FIG. 13, the blended audio output stream may be amplified before being sent to a user's headset.

In one exemplary embodiment, the portable audio mixing module may be adapted to receive Local User Chat from at least one user such that the user may converse with remote, networked gamers. As discussed above, the portable audio mixing module may transmit the received Local User Chat to a game console controller or a base station.

Referring to FIG. 9, in one embodiment, Local User Chat may be received from a user's headset at a headset jack JP4 and sent to a game console controller (not shown). The Local User Chat may travel through a low voltage microphone processor U4, such as but not limited to industry part no. SSM2167. The microphone processor U4 may provide noise gating and automatic level control to provide a cleaner, noise free voice chat stream. The processed Local User Chat MIC_ALC may then be transmitted through a game console controller jack JP7 to a game console controller (not shown). In one embodiment, a game console controller may be connected to the game console controller jack JP7 via a wire having a 2.5 mm male adapter at both ends. Although not shown, the game console controller may then transmit the Local User Chat to a connected game console such that it may be shared with networked gamers.

In another embodiment, Local User Chat may be received from a user's headset at headset jack JP4 and sent to a base station (not shown). In this embodiment, the Local User Chat MIC_ALC may still be amplified by, for example, passage through a low voltage microphone processor U4. However, as shown in FIG. 10, instead of being sent to a game console controller, the Local User Chat MIC_ALC may be encoded by, for example, a CODEC U6 (pin 24 (MIC)). The encoded Local User Chat MIC_ALC may be further processed and sent to the wireless transmitter/receiver and transmitted wirelessly to the base station.

Although exemplary embodiments described herein refer to a physical connection between a portable audio mixing module and a user's headset, it will be appreciated that such a connection may be wireless. Therefore, it is contemplated that a user having a wireless headset may connect the headset to the portable audio mixing module such that the user may have better control over such functions as balancing Game Audio and Network Chat.

Base Station

FIGS. 14 through 20 represent multiple elements of an exemplary embodiment of a base station according to the invention. Referring first to FIG. 14*a*, an exemplary front view of an embodiment of a base station is shown. The body of the base station may comprise a plastic or metal casing having any number of buttons, status indicators, graphics and the like.

As shown, the base station may comprise a power/pair button 1410 (FIG. 15 at "Power Switch"), which may be pressed by a user in one embodiment to power the base station on and off. The power/pair button 1420 (15 at "Power Switch") may be electrically connected to an LED or similar circuitry (FIG. 15 at D3, D10) such that the power status of the base station may be indicated to a user. For example, the power/pair button 1420 (FIG. 15 at "Power Switch") may illuminate when the base station is turned on and darken when the base station is turned off. Exemplary base station power circuitry may be found in, for example, FIG. 15.

In certain embodiments, the base station may comprise a Dolby on/off button 1410 (FIG. 17 at "Dolby Switch"), which, when pressed by a user, instructs the base station to format and transmit Game Audio in Dolby® Headphone Surround Sound, Dolby® Digital 7.1, Dolby® Digital 5.1 and/or Dolby® Pro Logic II formats. When the Dolby on/off button 1410 (FIG. 17 at "Dolby Switch") is pressed, the base station may turn on this feature and begin transmitting audio in a compatible Dolby® format. When the Dolby on/off button 1410 (FIG. 17 at "Dolby Switch") is pressed again, the base station may stop transmitting audio in Dolby® format, such that the base station operates in a 2-channel stereo mode, where no Dolby® processing is applied to the incoming audio signal. In certain embodiments, the Dolby on/off button 1410 (FIG. 17 at "Dolby Switch") may also be electrically connected to an LED or similar circuitry (FIG. 17 at D1, D12) such that status of audio formatting may be indicated to a user. It will be appreciated that certain Dolby® formats require the input audio stream to have certain formatting upon entering the base station, and streams lacking these required features may not be transmitted in a particular Dolby® formats. Additional Game Audio processing features of the base station are discussed below.

In one embodiment, the base station automatically detects any portable audio mixing modules that are in discovery mode and establishes a connection thereto. However, in other embodiments, the base station may comprise a separate pairing button (not shown) or the power/pair button 1420 (15 at "Power Switch") may be operable as a pairing button. In either of these embodiments, the user may press and hold the power/pairing button 1420 (15 at "Power Switch") for a period of time (e.g., 3 seconds) in order to set the base station into discovery mode. Once in discovery mode, the base station may be paired to a portable audio mixing module, which is also in discovery mode. The power/pair button 1420 (15 at "Power Switch") may also be electrically connected to an LED or similar circuitry (FIG. 15 at D2, D7) such that pairing status of the base station may be indicated to user. In one embodiment, once the user holds the power/pair button 1420 (15 at "Power Switch") for an amount of time, a LED (FIG. 15 at D2, D7) may begin to blink to indicate that the base station is in discovery mode. Once the base station pairs with a portable audio mixing module, the LED (FIG. 15 at D2, D7) of the power/pair button 1420 (15 at "Power Switch") may remain illuminated to indicate a connection. To unpair the base station from the portable audio mixing module, a user may hold down the power/pair button again.

Figure 14A:
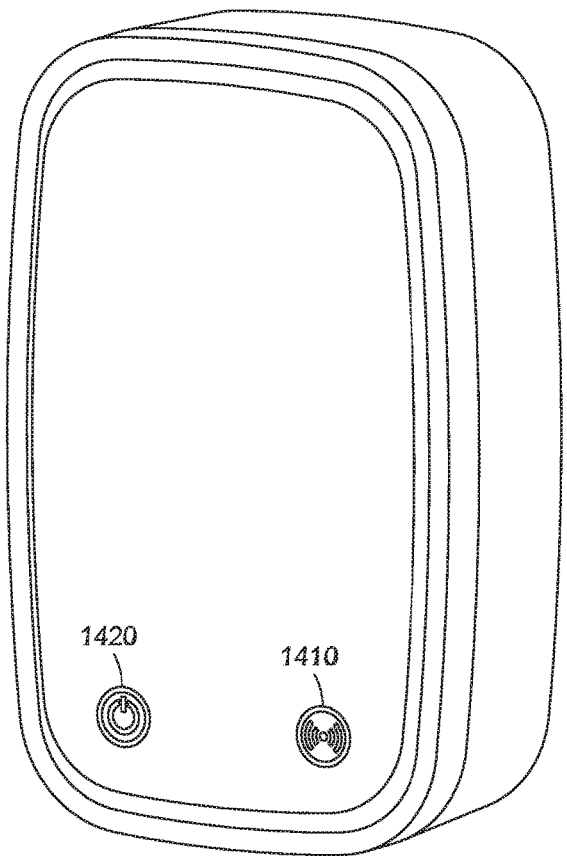
FIG. 14a illustrates a front-end view of an exemplary embodiment of a base station.
Figure 14B:
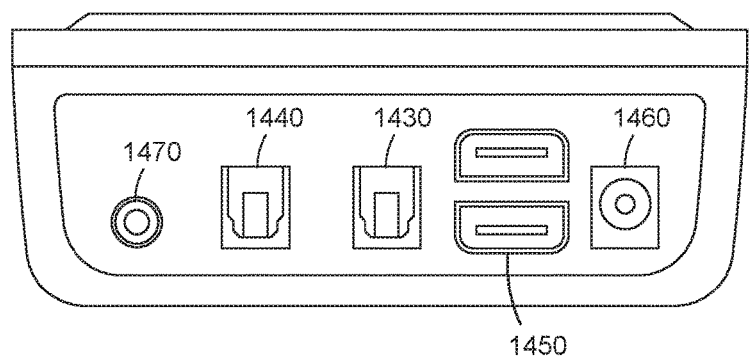
FIG. 14b illustrates a bottom-end view of an exemplary embodiment of a base station.
Figure 15A:
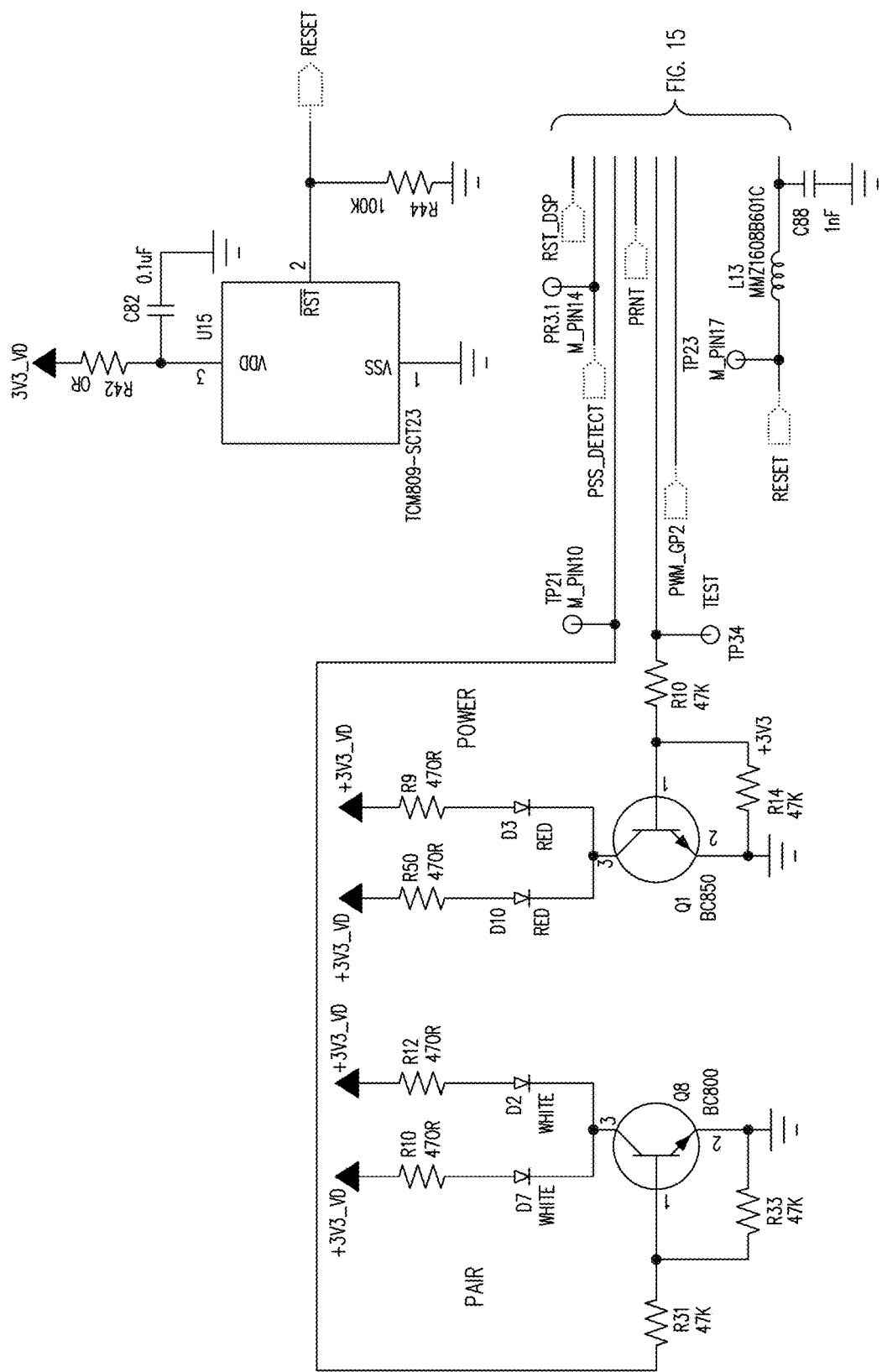
Figure 15B:
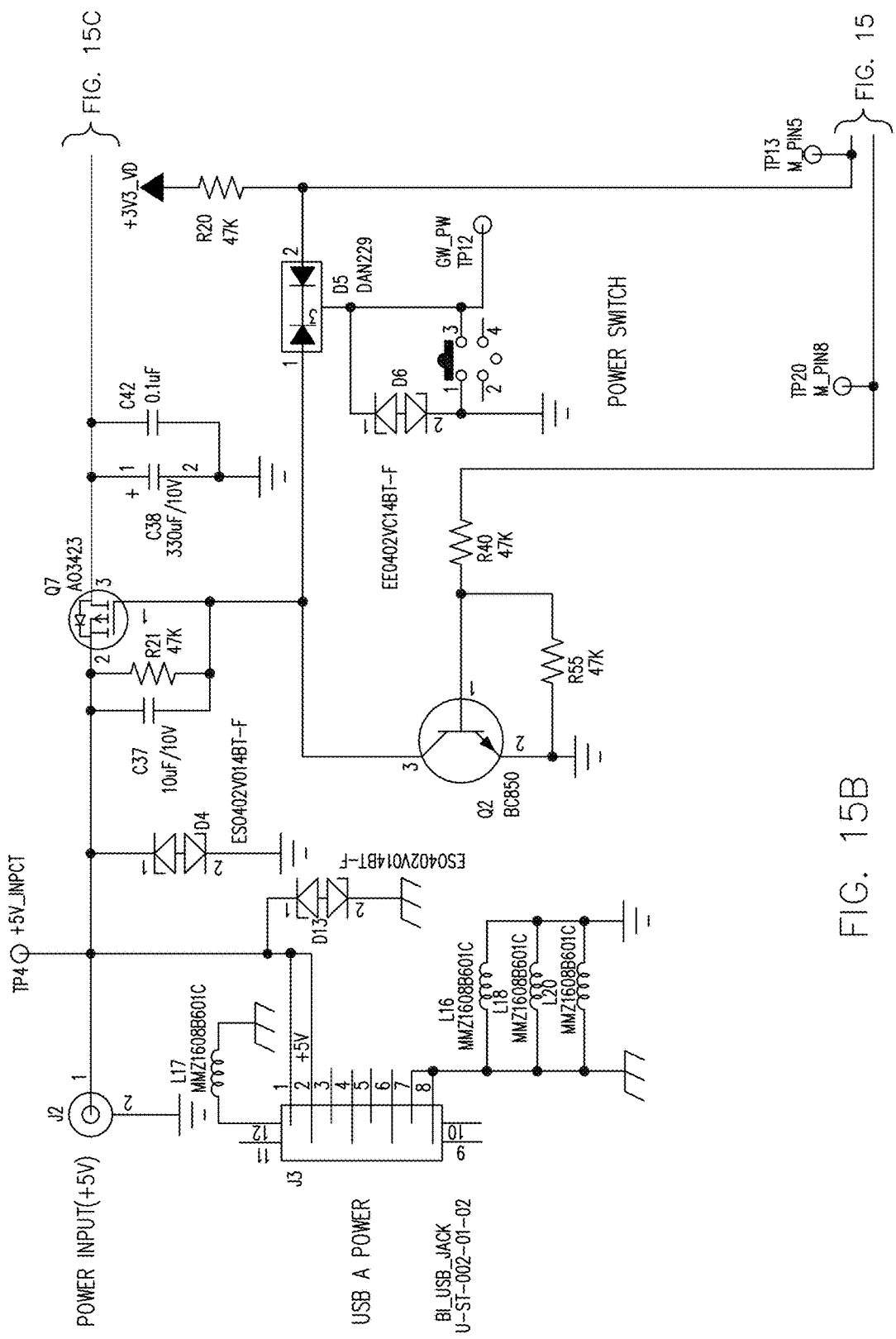
Figure 15C:
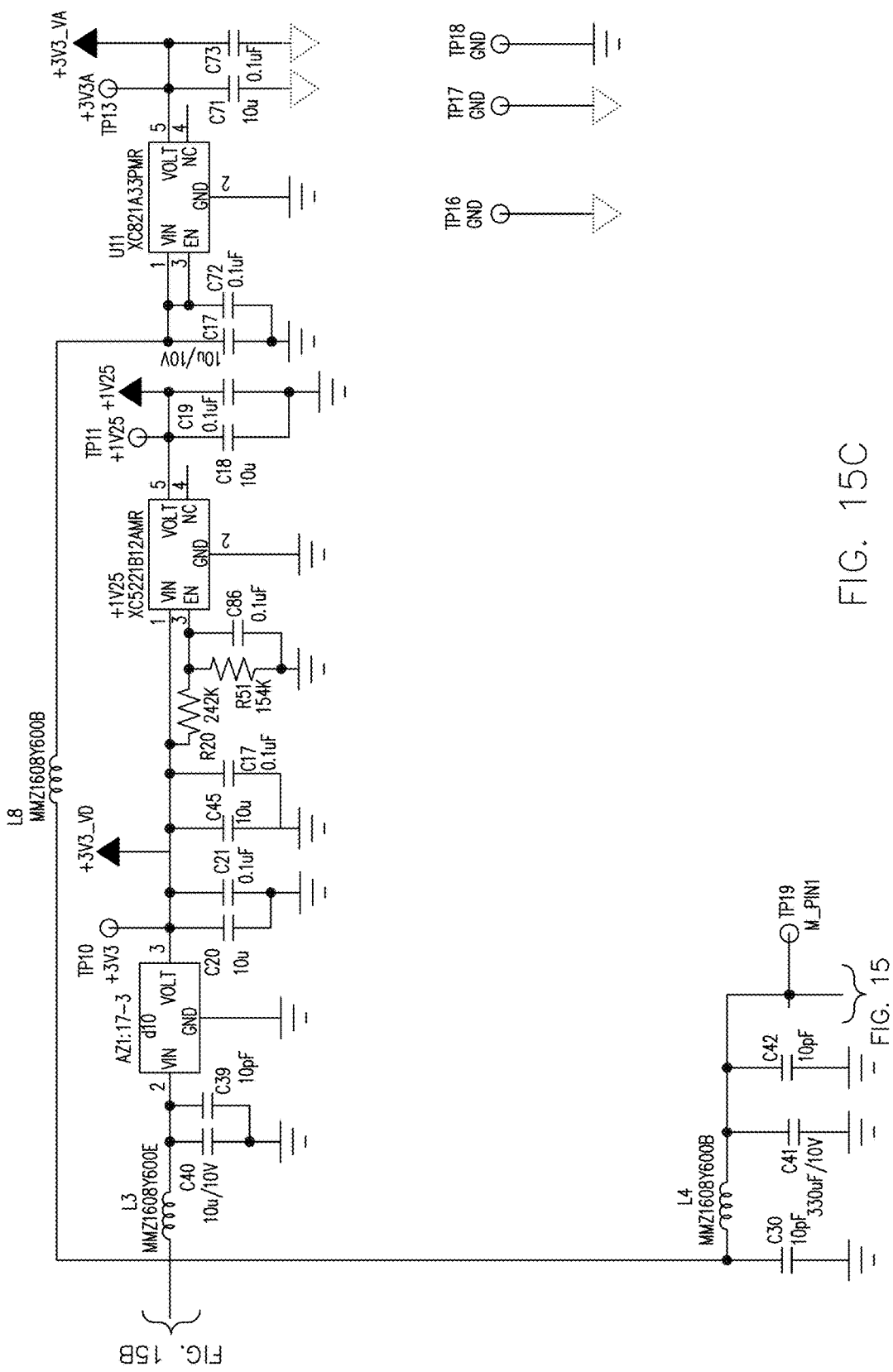

FIG. 14*b* shows a back-end view of an exemplary base station. In one embodiment, the base station comprises a power jack 1460 (FIG. 15 at J2) such that the base station may receive power via a cable from a power supply, such as an electrical outlet and/or a USB jack of a game console. FIG. 15 shows an exemplary power circuit for one embodiment of the base station. As shown, the base station may receive power via, for example, a power input J2.

Referring back to FIG. 14*b*, the base station may also comprise any number of USB jacks 1450 (FIG. 15 at J3). As described above, a portable audio mixing module may be electrically coupled to a USB jack 1450 (FIG. 15 at J3) of a base station, via, for example, a USB cable, such that a rechargeable battery of the portable audio mixing module may be charged thereby. Exemplary USB jack 1450 circuitry may be seen in FIG. 15.

Figure 16:
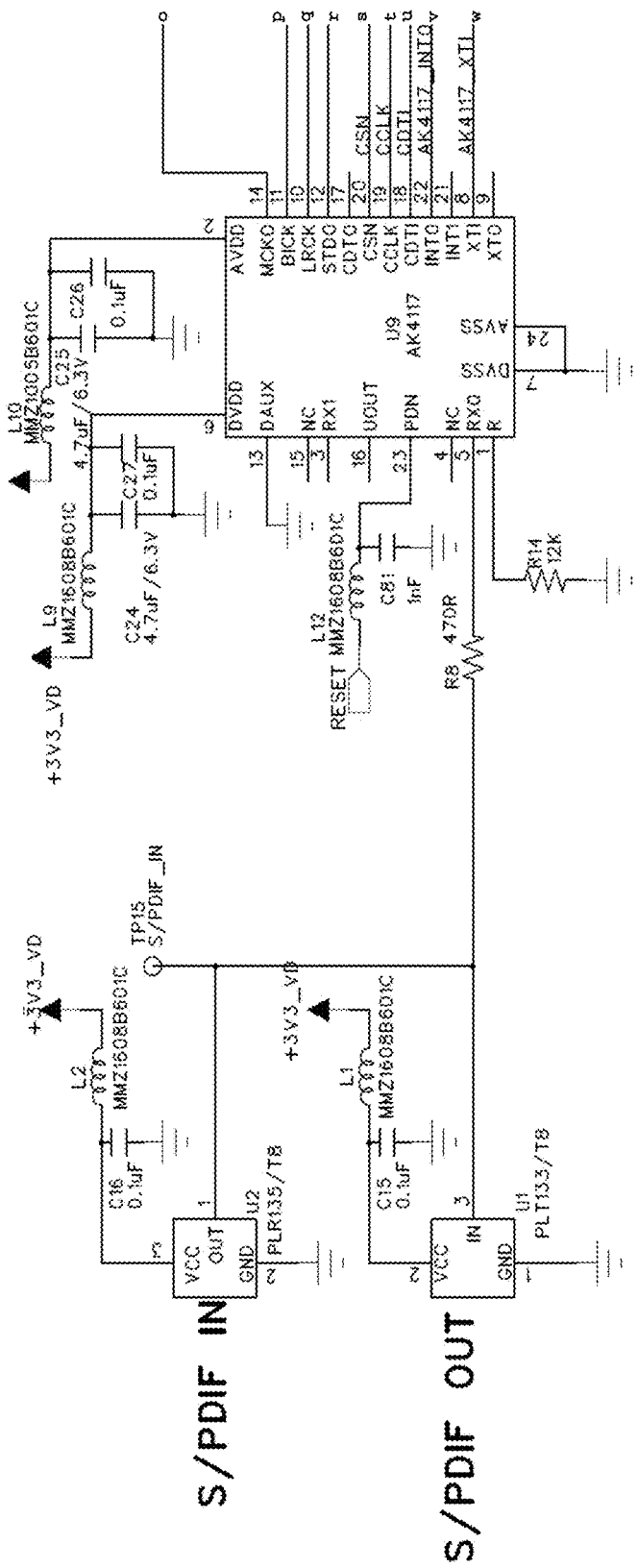
FIG. 16 is a circuit diagram illustrating exemplary circuitry of an embodiment of a base station.

Still referring to FIG. 14*b*, the base station may further comprise both an audio-in jack 1430 (FIG. 16 at U2) and an audio-out jack 1440 (FIG. 16 at U1). Preferably, the audio-in jack 430 (FIG. 16 at U2) and audio-out jack 1440 (FIG. 16 at U1) are TOSLINK® Optical jack, although the audio jacks 1430 (FIG. 16 at U2), 1440 (FIG. 16 at U1) may comprise any jack capable of receiving a male adapter of a digital audio cable. According to one embodiment, the base station may receive a digital audio stream from, for example, a game console, through the audio-in jack 1430 (FIG. 16 at U2). In a preferred embodiment, the received digital audio stream may be a Game Audio stream.

In one embodiment, the Game Audio stream may enter into the base station through the audio-in jack 1430 (FIG. 16 at U2) and be passed to the audio-out jack 1440 (FIG. 16 at U1). In this way, the base station may be viewed as a "pass-through" system. This feature may allow a user to leave a game console plugged into the audio-in jack 1430 (FIG. 16 at U2) even if the base station is not in use. As long as the user keeps, for example, a stereo system or television plugged into the audio-out jack 1440 (FIG. 16 at U1) of the base station, the Game Audio stream may pass through the base station and be received at such audio equipment to transmit the signal. Exemplary pass-through circuitry may be seen in FIG. 16.

Referring now to FIG. 16, an exemplary path of a Game Audio stream through an embodiment of a base station is now provided. The Game Audio stream may enter into the base station through the audio-in jack U2 and pass through a digital audio receiver U9, such as industry part no. AK4117. The Game Audio may travel along a wire from the audio-in jack U2 to a receiving channel of the digital receiver U9 (pin 5). The Game Audio stream may be output from digital receiver U9 at the audio serial data output pin (pin 12) through a wire (r) to, for example, a digital signal processor (FIG. 17 at US).

Figure 17:
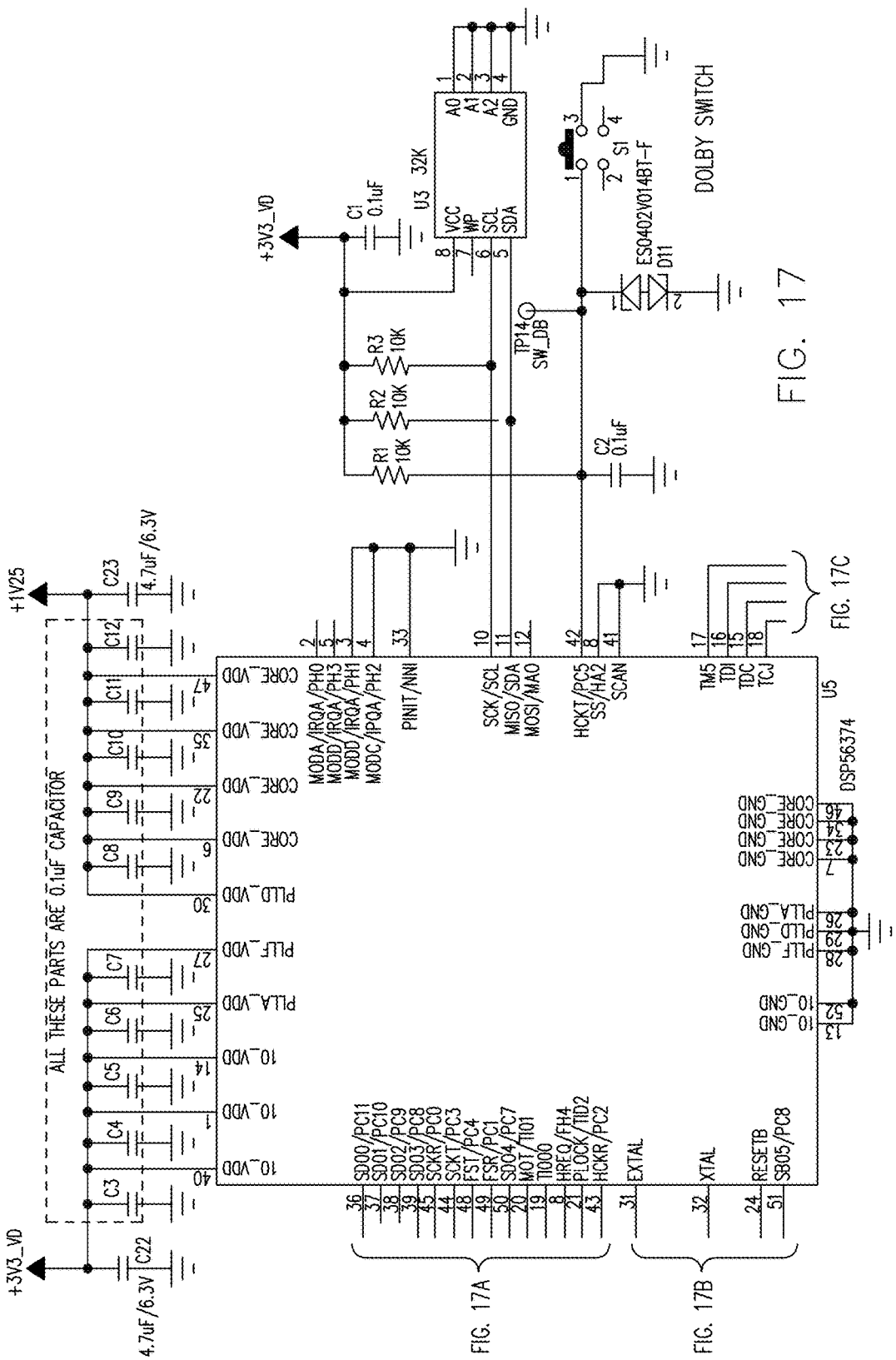
Figure 17A:
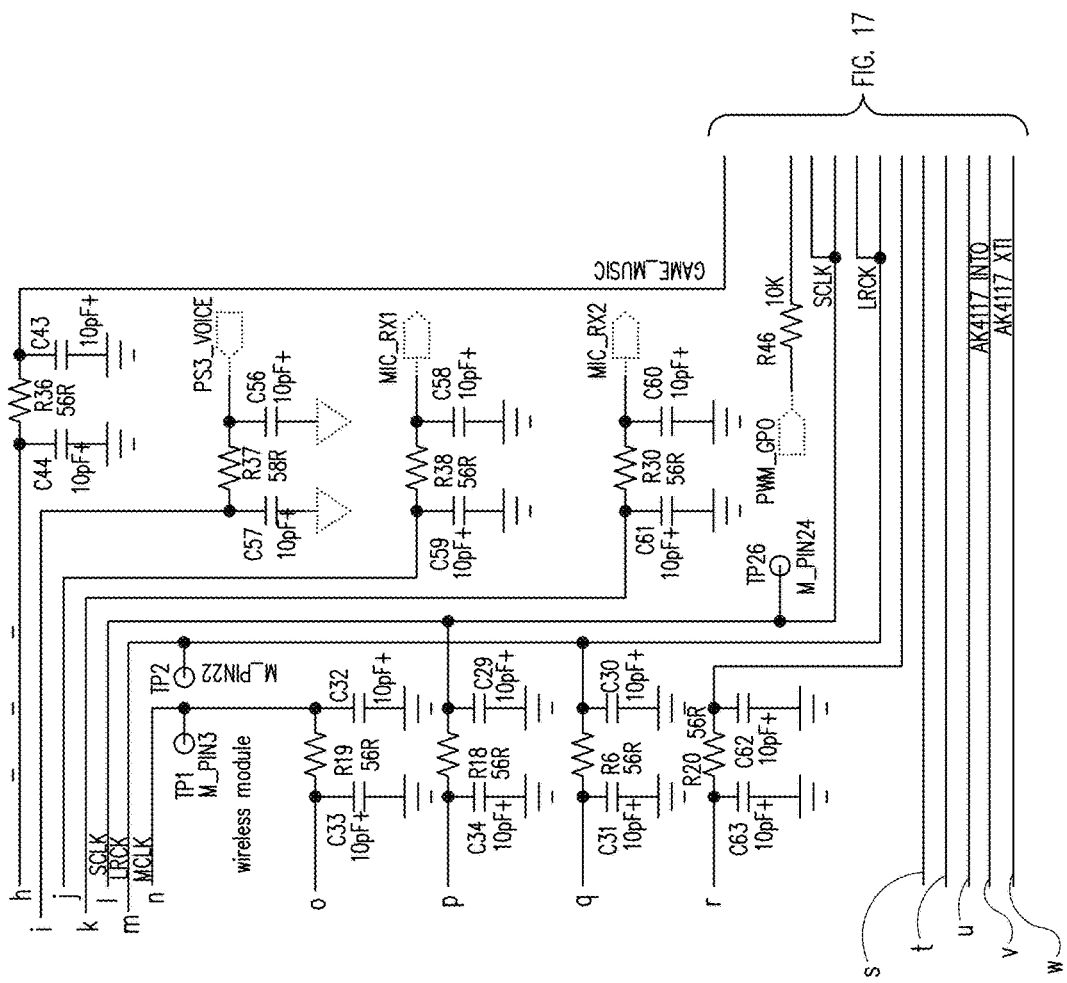

Referring now to FIG. 17, the Game Audio stream may travel through wire (r) to, for example, a digital signal processor US such as industry part DSP56374 (U5, pin 50). The digital signal processor U5 may be capable of processing the Game Audio stream into any number of formats including but not limited to Dolby® Headphone Surround Sound, Dolby® Digital 7.1, Dolby® Digital 5.1 and/or Dolby® Pro Logic II formats. The digital signal processor U5 may format the Game Audio using various equalization algorithms, compression, signal generation, tone control, fade/balance, level meter/spectrum analysis, matrix decoding and/or sound processing algorithms. The re-formatted Game Audio stream GAME_MUSIC may be output from the digital signal processor U5 (pin 36) and transmitted to, for example, a wireless transmitter/receiver module (FIG. 15 at U8) via a wire (h).

Referring back to FIG. 15, a wireless transmitter/receiver U8 is shown. The wireless transmitter/receiver module US may receive formatted Game Audio via a wire (h) at, for example, an input pin (pin 26, SDIO_W). In one embodiment, the wireless transmitter may send received compatibly-formatted audio signals, such as Game Audio and/or Network Chat, to a portable audio mixing module. As shown, the wireless transmitter module U8 may be a DWAM82 5.8 GHz Wireless Module.

Figure 18A:
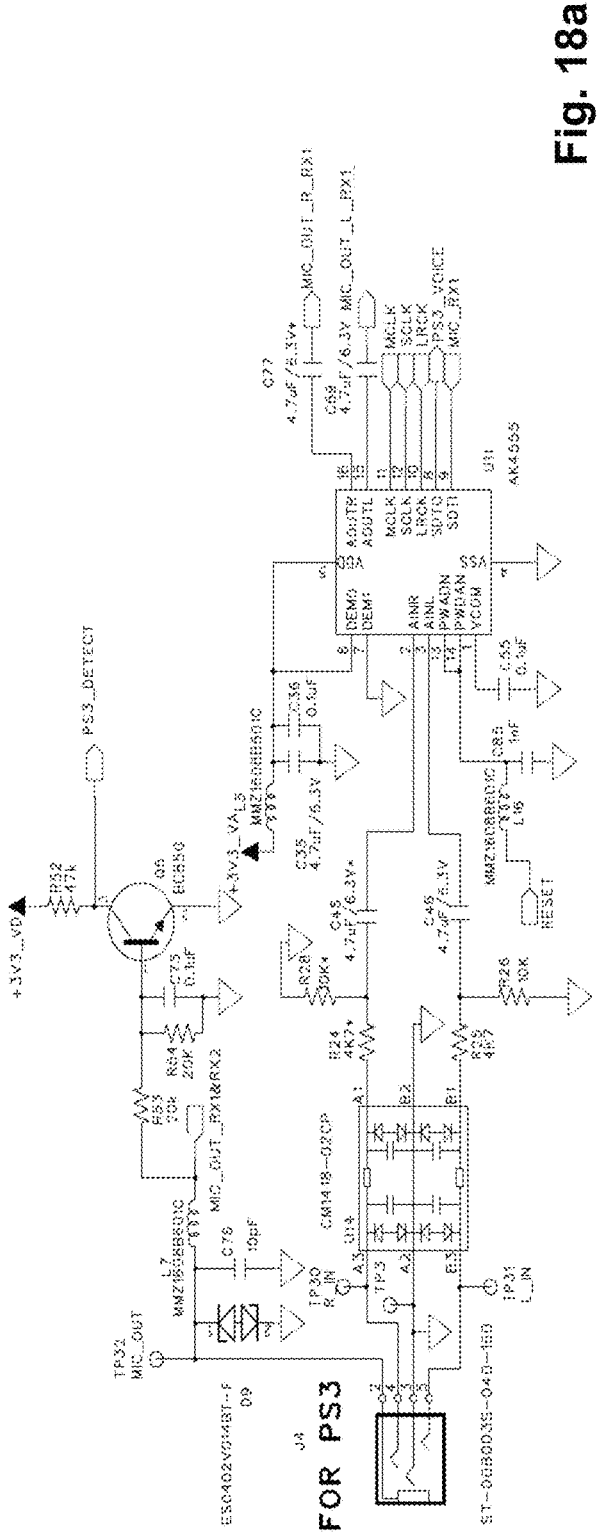
FIGS. 18a, 18b, and 18c are circuit diagrams illustrating exemplary circuitry of an embodiment of a base station.

Referring to the exemplary base station circuitry illustrated in FIG. 18a, in one embodiment, the base station may be capable of transmitting Network Chat PS3_VOICE to a portable audio mixing module. As shown, the base station may be connected to a PC/PS3 adapter (FIG. 19) through a PC/PS3 jack J4 (FIG. 14b at 1470). The Network Chat PS3_Voice may be received in analog form through, for example, at least one pin (pins 4 and 5) of the PC/PS3 jack J4 (FIG. 14b at 1470) and be transmitted to a A/D, D/A converter U11, such as but not limited to industry part no. AK4555. The A/D, D/A converter U11 may convert the analog Network Chat PS3_Voice signal to a digital signal such that it may be sent to a wireless transmitter/receiver module (FIG. 15 at U8, pin 21, wire i). Once received by the wireless transmitter/receiver module (FIG. 15 at U8) the Network Chat PS3_Voice may be transmitted wirelessly to a portable audio mixing module. In another embodiment, Network Chat PS3_Voice is not transmitted by the base station, but is rather transmitted by the game console to a game console controller.

In certain embodiments, the base station may be capable of receiving Local User Chat from a portable audio mixing module such that the Local User Chat may be transmitted to the game console and then over a network to networked gamers. Referring to FIG. 15, Local User Chat j, k (see FIG. 17 at MIC_RX1, MIC_RX2) may be received by the base station from multiple users of a game console. In one embodiment, a first user may produce Local User Chat j (see FIG. 17 at MIC_RX1) and a second user may produce Local User Chat k (see FIG. 17 at MIC_RX2) simultaneously and/or independently, and the Local User Chat of each user may be sent by the portable audio mixing module to the base station. The Local User Chat j, k (see FIG. 17 at MIC_RX1, MIC_RX2) may be received by a wireless transmitter/receiver U8 from a portable audio mixing module. Although only two channels of Local User Chat j, k (see FIG. 17 at MIC_RX1, MIC_RX2) are shown, in certain embodiments, up to four channels of Local User Chat are supported.

Figure 18B:
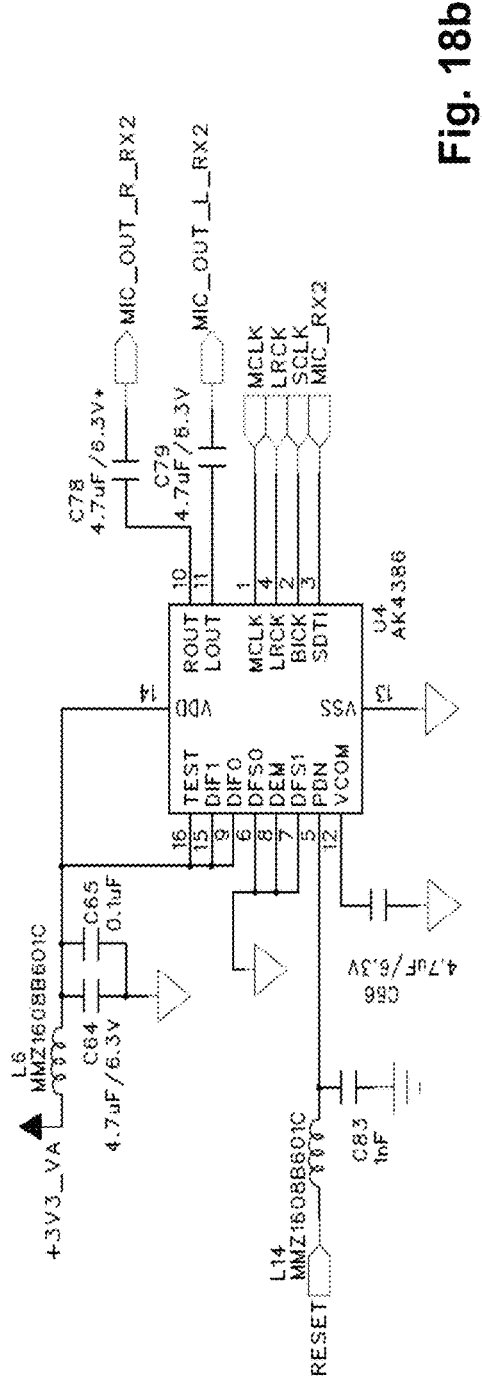
Figure 18C:
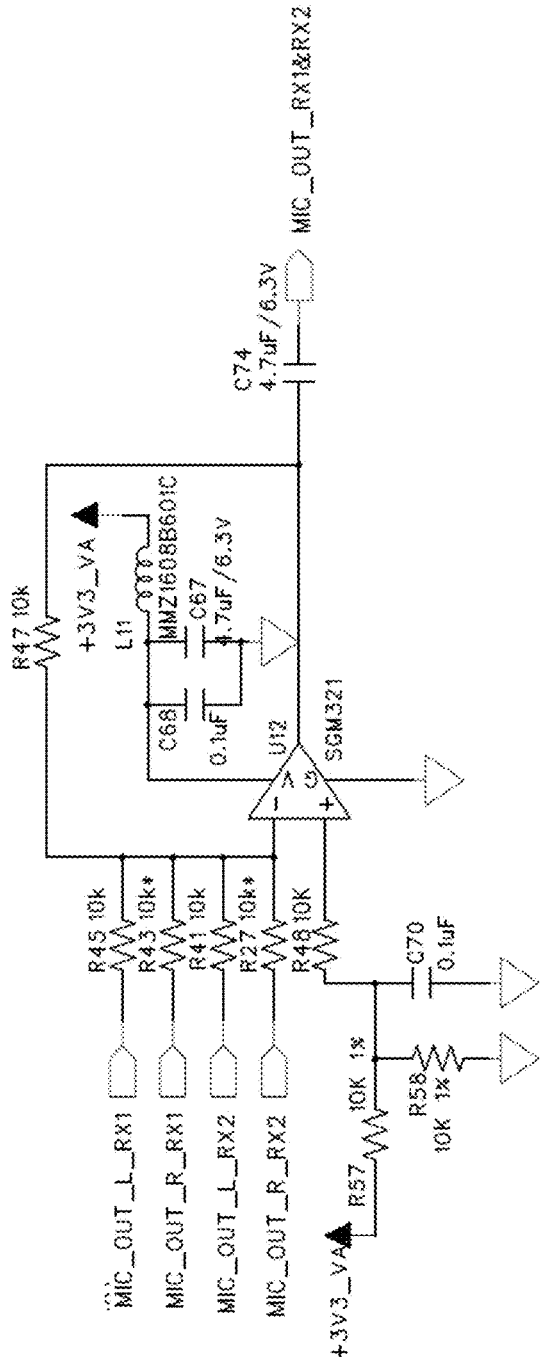

Referring to FIG. 18a a first user's Local User Chat MIC_RX1 may be converted from a digital form MIC_RX1 to an analog form MIC_OUT_R_RX1, MIC_OUT_L_RX1 by, for example, a D/A converter U11. Similarly, as shown in FIG. 18b, a second user's Local User Chat MIC_RX2 may be converted from a digital form MIC_RX2 to an analog form MIC_OUT_R_RX2, MIC_OUT_L_RX2. At FIG. 18c, the analog form of user 1's Local User Chat MIC_OUT_R_RX1, MIC_OUT_L_RX1 and the analog form of user 2's Local User Chat MIC_OUT_R_RX2, MIC_OUT_L_RX2 may be summed into a single audio stream MIC_OUT_RX1&RX2. At FIG. 18a, the summed single audio stream MIC_OUT_RX1&RX2 may be transmitted from the base station to, for example, a PC/PS3 adapter (FIG. 19) through a PC/PS3 jack J4. In another embodiment the first user's Local User Chat MIC_RX1 and second user's Local User Chat MIC_RX2 may be combined in digital form (via, for example, a DSP chip) into a single, digital audio stream. In this embodiment, the combined digital audio stream may be transmitted directly to a game console via a USB cable or Bluetooth connection. As previously discussed, in another embodiment, the Local User Chat may bypass the base station, and may be transmitted directly from a game console controller to a game console connected thereto.

PC/PS3 Adapter

As described herein, in certain embodiments, Network Chat will not be received by a game console controller and Local User Chat will not be sent by the game console controller. In these embodiments (shown in FIG. 2), such audio streams must be handled by the components of the system, such as the base station and portable audio mixing module. In one embodiment, a PC/PS3 adapter may be placed into the system between the base station and the game console such that the base station may receive both the Game Audio and Network Chat, and may also transmit Local User Talk from each user to the game console.

Figure 19A:
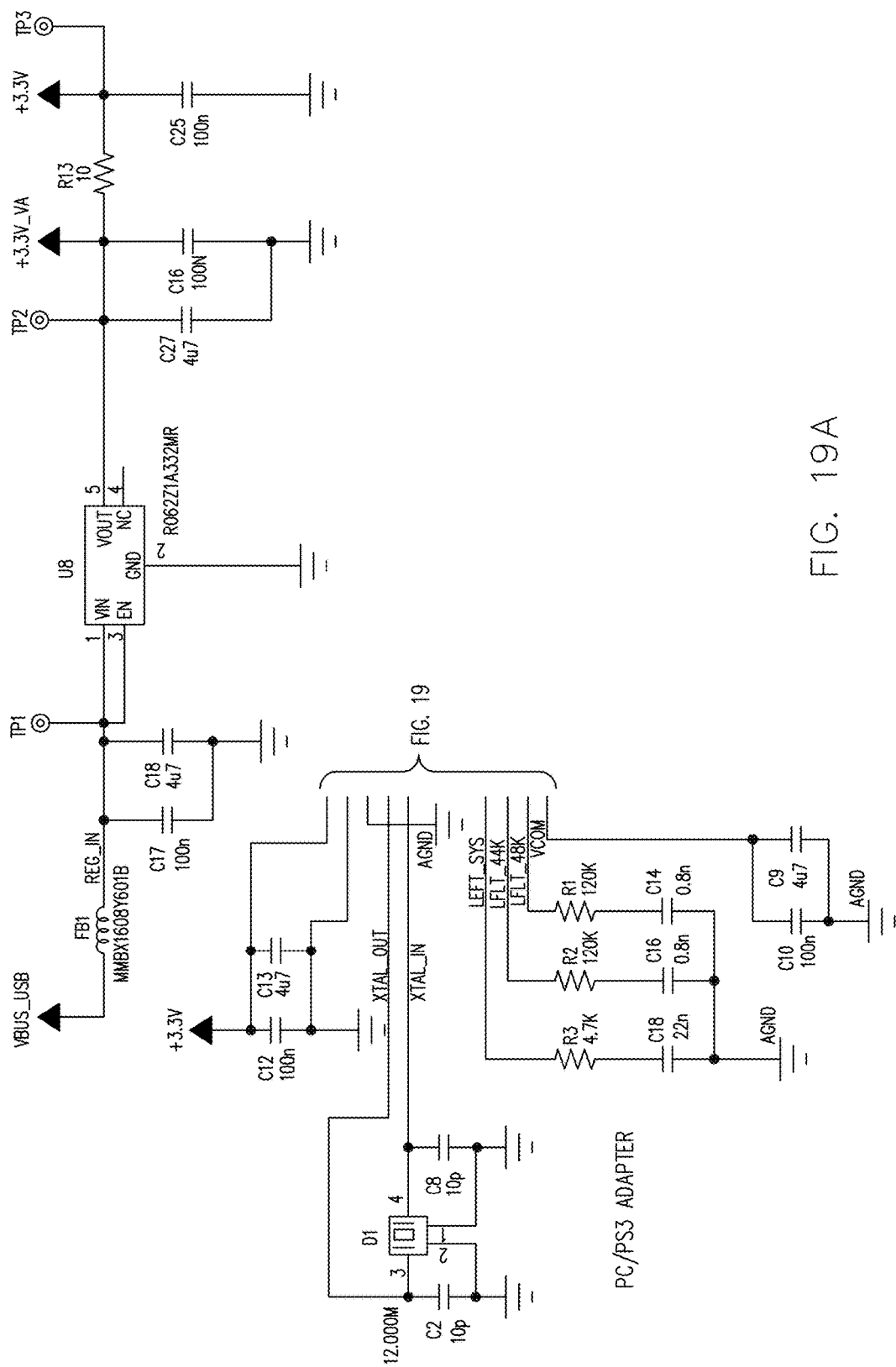
Figure 19B:
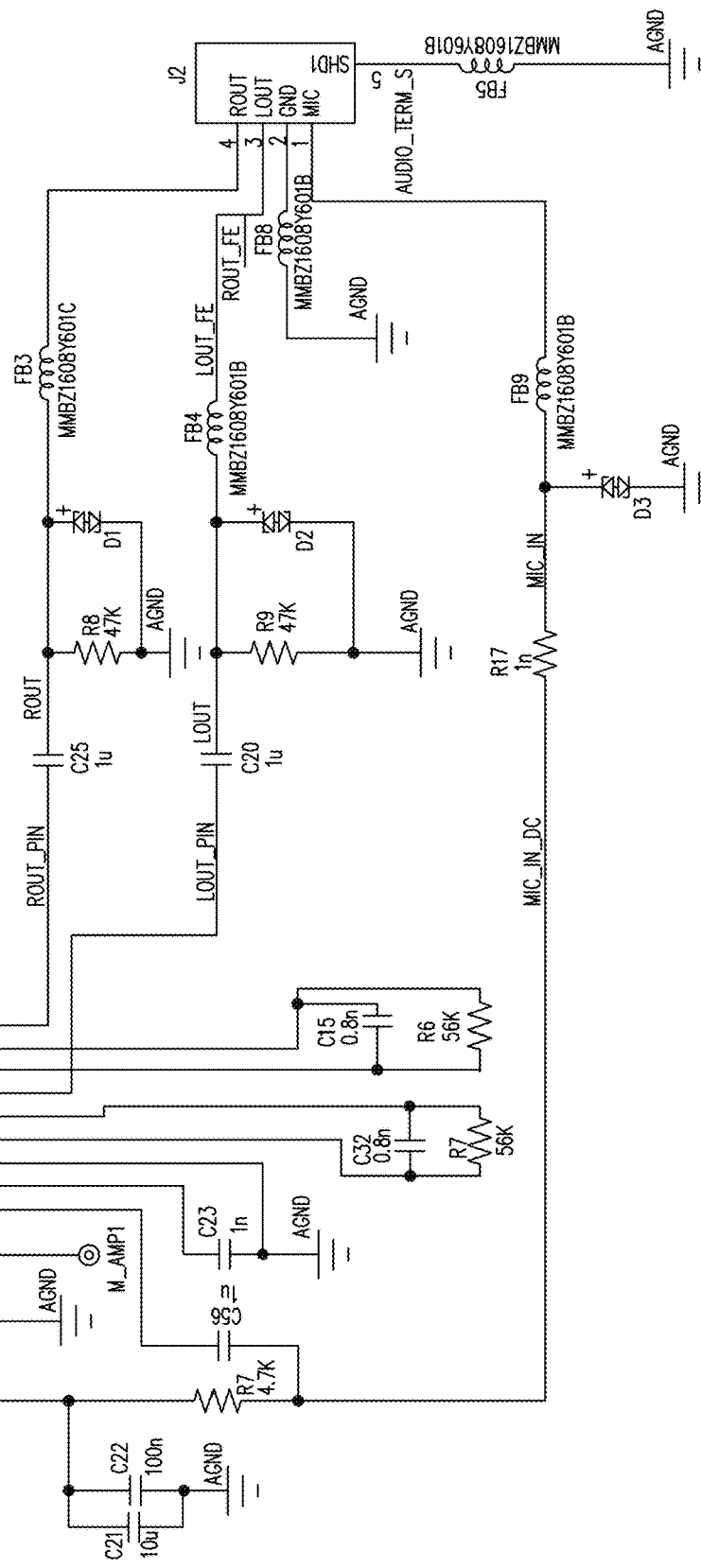

Referring to FIG. 19, exemplary circuitry of an embodiment of a PC/PS3 adapter is shown. In one embodiment, the adapter may be internally housed within the base station. In other embodiments, the PC/PS3 adapter may be in the form of a cable comprising a housing with circuitry therein. The cable may comprise a first end in the form of a USB jack J1 and a second end in the form of a 3.5 mm jack J2. The PC/PS3 adapter may comprise an audio CODEC U1, that may perform both A/D and D/A conversion. In one embodiment, the audio CODEC U1 may be industry part AK4571, which is a USB interface audio CODEC that incorporates a 16-bit single-channel A/D converter and a 16-bit two-channel D/A converter.

In one embodiment, the USB jack J1 may be inserted, for example, into the female USB port of a game console such as but not limited to a PlayStation3® or personal computer. The 3.5 mm jack J2 of the PC/PS3 adapter may be inserted into the PS3/PC port (FIG. 18a at J4) of the base station. Once connected, an audio stream such as a Network Chat audio stream may be transmitted in digital form from the game console to the USB jack J1, where it is received at the audio CODEC U1. The Network Chat may be converted to an analog signal and sent from the audio CODEC U1 (pin 21, 24), through the PS3/PC 3.5 mm jack J2, to the PS3/PC port (FIG. 18a at J4) of a base station.

In some embodiments, User Local Chat may be received from a PS3/PC port (FIG. 18a at J4) of a base station by the PS3/PC adapter 3.5 mm jack (J2) in analog form. The User Local Chat may be converted by the audio CODEC U1 into a digital form and sent through the USB jack J1 to the game console. It will be appreciated that the Network Chat and User Local Chat may be simultaneously transmitted and received by the game console, the PS3/PC adapter, and the base station. Moreover, it will be appreciated that the PS3/PC adapter may simultaneously convert the Network Chat from a digital to analog form and the User Local Chat from an analog to digital form. In certain embodiments, the PS3/PC adapter may contain such circuitry as to perform programmable gain, pre-amplification, bass boost, data storage, noise suppression and the like.

In other embodiments, the PS3/PC adapter may comprise a Bluetooth transceiver located within the base station (not shown). In such an embodiment, neither Local User Chat nor Network Chat need be converted from digital form to analog form, as either audio stream may be transmitted or received in digital form by the Bluetooth transceiver. Accordingly, the Bluetooth transceiver may be adapted to be connected or paired to a Bluetooth transceiver of a game console. Moreover, such a Bluetooth transceiver may be powered by, for example, the power circuitry shown in FIG. 15, additional power circuitry, or even a battery.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

We claim:

1. A system for transmitting a game audio stream and network chat audio stream to a headset of a user of a gaming console, the system comprising:
    a base station adapted to receive the game audio stream from a game console; and
    at least one portable audio mixing module wirelessly connected to the base station and adapted to receive the game audio stream therefrom and further adapted to separately receive the network chat audio stream from a game console controller in communication with the gaming console, the portable audio mixing module including mixing circuitry such that the network chat audio stream and game audio stream are mixed at the at least one portable audio mixing module to produce a blended audio output stream for transmission therefrom to the headset of the user;
    wherein the portable audio mixing module comprises adjustment means such that a user may adjust balance of the single blended audio output stream, wherein the balance of the single blended audio output stream may be adjusted to allow the user to hear only network chat, only game audio, and any combination thereof up to and including volume levels of 0% to 100% for each of network chat and game audio.

2. The system of claim 1, wherein the at least one portable audio mixing module is adapted to transmit the blended audio output stream wirelessly to the headset of the user.

3. The system of claim 1, wherein the at least one portable audio mixing module is adapted to receive the network chat audio stream wirelessly from the game console controller.

4. The system of claim 1, wherein the portable audio mixing module is adapted to receive local user chat from the headset.

5. The system of claim 4, wherein the portable audio mixing module is further adapted to transmit the local user chat to the game console controller.

* * * * *